United States Patent [19]
Calamvokis et al.

[11] Patent Number: 5,572,522
[45] Date of Patent: Nov. 5, 1996

[54] ASYNCHRONOUS TRANSFER MODE SWITCH WITH MULTICASTING ABILITY

[75] Inventors: Costas Calamvokis, Bishopston; David Banks, Redland, both of England

[73] Assignee: Hewlett-Packard Company, Palo Alto, Calif.

[21] Appl. No.: 422,122

[22] Filed: Apr. 13, 1995

[30] Foreign Application Priority Data

Apr. 28, 1994 [EP] European Pat. Off. .............. 94303120

[51] Int. Cl.$^6$ ...................................................... H04L 12/56
[52] U.S. Cl. ........................... 370/60.1; 370/61; 370/94.2
[58] Field of Search ................................. 370/58.1, 58.2, 370/58.3, 60, 60.1, 61, 94.1, 94.2, 94.3, 79, 82

[56] References Cited

U.S. PATENT DOCUMENTS

| | | | |
|---|---|---|---|
| 5,229,991 | 7/1993 | Turner | 370/60 |
| 5,271,004 | 12/1993 | Proctor et al. | 370/60 |
| 5,291,482 | 3/1994 | McHarg et al. | 370/60 |
| 5,303,233 | 4/1994 | Sugawara | 370/60 |
| 5,394,397 | 2/1995 | Yanagi et al. | 370/60.1 |
| 5,436,893 | 7/1995 | Barnett | 370/60.1 |

FOREIGN PATENT DOCUMENTS 0321310  7/1989  European Pat. Off. .

OTHER PUBLICATIONS

IBM Technical Disclosure Bulletin, vol. 34, No. 10A, Mar. 1992, New York, pp. 464–465 "Multicast/Broadcast Mechanism for a Shared Buffer Packet Switch".

Wescon Technical Papers, Oct. 1984, North Hollywood US pp. 1–8.
Computer Communications, vol. 16, No. 11, Nov. 1993, Guildford GB –pp. 736–739.
International Journal Of Digital And Analog Communication Systems, vol. 5, 1992 –Chichester, GB pp. 29–37.

*Primary Examiner*—Alpus H. Hsu

[57] ABSTRACT

An ATM switch with multicast capability is provided that internally uses input and output identifiers to identify the cell input and output streams, the relevant input identifier being generated for each cell as it arrives. The apparatus stores both the cell bodies of the cells received by the input means and a respective sequence data set for each input stream. Each sequence data set serves to order the cell bodies received for the corresponding input steam in order of receipt. The sequence data sets are held in a queuing block that includes an input control which upon a new cell body being stored, updates the sequence data set of the input stream to which the cell belongs as identified by the corresponding input identifier. The queuing block also has an output control for maintaining for each output stream a sequence position indicator referencing into the sequence data set of the corresponding input stream to indicate the next cell body to be sent on the output stream concerned. A scheduling block of the apparatus outputs the output identifier of the output stream on which a cell is next to be output. This identifier is used by the output control of the queuing block to look up the corresponding sequence position indicator which it uses, in turn, to reference into the corresponding sequence data set thereby to identify the cell next to be sent on the scheduled output stream. The same queuing arrangement can also be used in systems handling variable-length packets.

9 Claims, 15 Drawing Sheets

FIG. 5
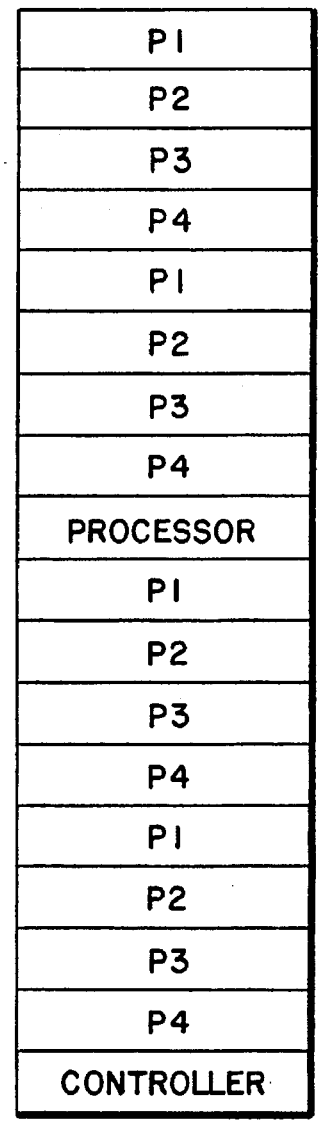
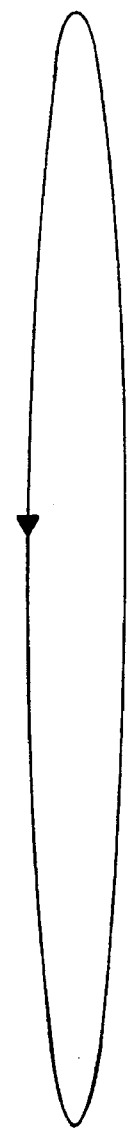
FIG. 7
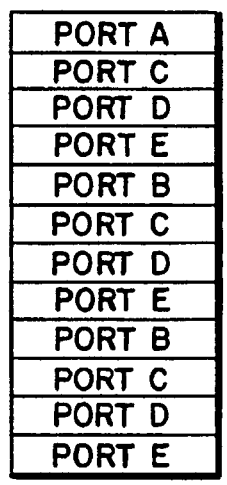
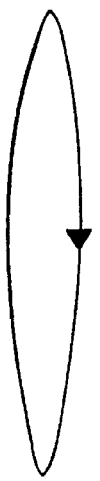
PORT A = 51 Mb/s
PORT B = 100 Mb/s
PORT C = 155 Mb/s
PORT D = 155 Mb/s
PORT E = 155 Mb/s

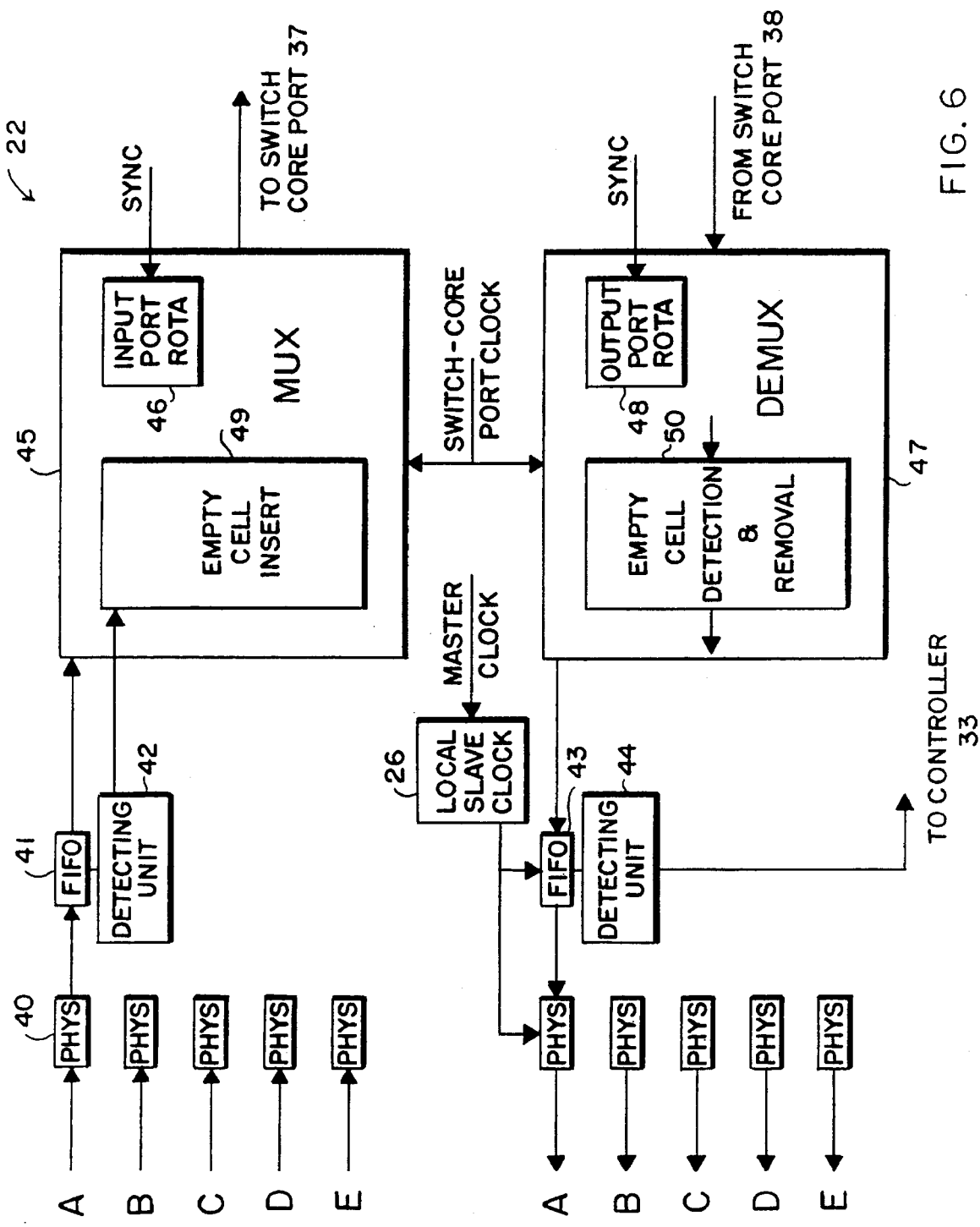

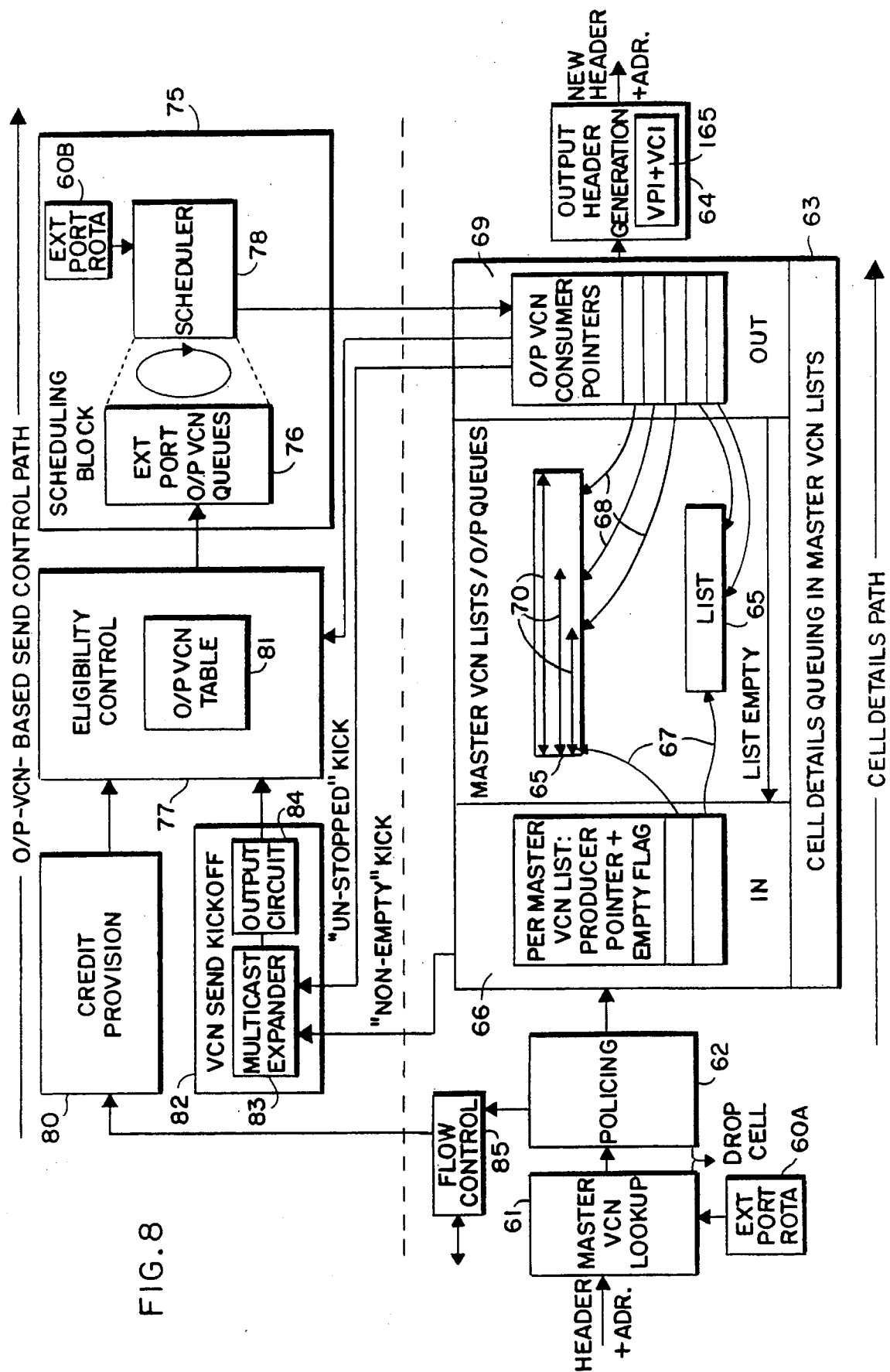

ASYNCHRONOUS TRANSFER MODE SWITCH WITH MULTICASTING ABILITY

The present invention relates generally to multicasting apparatus for multicasting packets (including fixed-length packets or "cells"); in particular, but not exclusively, the present invention relates to an ATM switch with cell multicasting capability.

ATM (Asynchronous Transfer Mode) is a multiplexing and switching technique for transferring data across a network using fixed sized cells that are synchronous in the sense that they appear strictly periodically on the physical medium. Each cell comprises a payload portion and a header, the latter including a label that associates the cell with an instance of communication between sending and receiving network end systems; this instance of communication may involve the transfer of many cells from the sending end system, possibly to multiple receiving end systems. ATM is asynchronous in the sense that cells belonging to the same instance of communication will not necessarily appear at periodic intervals.

In ATM, the labels appended to the cells are fixed-size context dependent labels, that is, they are only understandable in the light of context information already established at the interpreting network node, the label generally being replaced at one node by the label required for the next node. In other words, ATM is a virtual circuit technology requiring a set up phase for each instance of communication to establish the appropriate label knowledge at each node.

ATM technology is finding increasing popularity because it can offer an acceptable compromise in combining timeliness characteristics (normally associated with circuit switching technologies) and statistical advantage (associated with packet switching technologies). ATM holds out the prospect of a single transfer mode technology for carrying all traffic types, including voice, entertainment services, or computer traffic.

The present invention is applicable generally to ATM systems (and other systems) independently of specific implementation details such as cell size and reference to ATM in the accompanying claims should be accordingly interpreted. However, in the following description, particular reference will be made to the emerging B-ISDN ATM standards being evolved by the CCITT and the ATM Forum (the former being primarily concerned with public networks and the latter with computer-related user networks).

In fact, even within these emerging standards, the semantics of the information contained in the header portion of each cell varies depending on where in the network the cell appears (at its edge or internally), and the nature of the overlying ATM adaption layer which processes ATM cells in the network end systems. Unless specifically stated otherwise, in the following description the cell format under consideration is the B-ISDN UNI (User Network Interface) cell format for AAL5 services ("AAL" refers to the ATM Adaption Layer, AAL5 being a connection oriented, variable bit rate asynchronous communication service appropriate to computer communication).

FIG. 1 of the accompanying drawings shows the format of such a cell in a byte wide format. As can be seen, the cell is made up of a 5-byte header and a 48-byte payload of user data. The header fields are as follows:

| GFC | 4 bits | General Flow Control Field; |
| --- | --- | --- |
| VPI | 8 bits | Virtual Path Indicator field; |
| VCI | 16 bits | Virtual Channel Indicator field; |
| PT | 3 bits | Payload Type Field; |
| EOP | 1 bit | End of Packet Field; |
| HEC | 8 bits | Header Error Check Field; |

The VPI and VCI together form the virtual circuit label for the cell on a particular link and this label forms the basis on which the cell is routed at the next network node it encounters. Generally, in ATM parlance, a virtual circuit is called a "Virtual Channel" and the VPI fields can be thought of as identifying a group of virtual channels on a link whilst the VCI identifies a particular virtual channel in that group.

The EOP bit is used to indicate that the cell is the last cell of a sequence of cells that together make up a higher level application data unit (packet). The advantage of giving this end of packet information visibility in the cell header, is that it enables all the cells making up a packet to be discarded if one constituent cell is lost.

An ATM cell arriving at a network node through one port will be re-routed (or switched) according to the VPI and VCI information stored in the cell header and the context information established in the node at set up time. The VPI and VCI information will be changed and the cell output. Such a node is generally referred to as an ATM switch 10 and conceptually comprises an N-port switch core that is responsible for carrying out the following operations on the cells it handles:

determining which cell belongs to which channel;

deciding what channel a cell is destined for and routing it there; and, arbitrating among demands for access to the appropriate output port.

The switch will also include some sort of a processor unit for looking after channel set up and any management functions, and interface circuitry for interfacing the switch core to the links connected by the switch, these links connecting to respective external ports of the switch.

The switch core is generally designed to have a high bandwidth and this enables the switch to be used to service a plurality of links that are either inherently or statistically of low bandwidth, these links being first multiplexed together before being fed to the switch core. Conversely, the output of the switch core is demultiplexed for passing to the appropriate link.

FIG. 2 shows a known form of ATM switch in which a common memory is used to temporarily store all the cells passing through the switch. More particularly, a number of input links 4 are connected to a multiplexer 1 which feeds a switch core 2; the switch core in turn outputs cells to a de-multiplexer 3 where they are distributed to the appropriate output link 5. Generally, the input and output links 4, 5 are paired.

The multiplexer cyclically passes a cell from each input link 4 to the switch core 2. Each cell is split by splitter 6 into its header which is passed to a header converter 10 via line 7, and the cell body which is output from the splitter on line 9.

The header converter 10 examines the VPI+VCI information contained in each header together with input link identity information passed to it over line 8 from the multiplexer 1. On the basis of this information, the header converter 10 generates a new header with an appropriate VPI+VCI and passes this header on line 11 to a combiner 12 to which the line 9 carrying the cell body is also connected. The combiner 12 then recombines the cell header and body and stores the cell in a common memory 13 at an address which is output on line 14. For each ouput link, a corresponding output queue 16 is maintained in the switch core. As each cell is stored in the common memory, the corresponding address is passed to the output queue 16 appropriate for that cell, the identity of this output queue being supplied over line 15 from the header converter to cause the address to be stored in the correct queue.

The de-multiplexer 3 cyclically queries the output queue 16 over line 17 to cause each output queue in turn to output the address of the next cell intended for the corresponding output link. The address output from each queue is fed by line 18 to the common memory 13 to cause the corresponding cell to be output on line 19 to the de-multiplexer 3. The de-multiplexer then directs the cells to the appropriate output link 5.

One problem with this simple architecture is that it is not well adapted for multicasting, that is, where a cell is to be output on a number of different output links. For example, if multicasting is achieved by having the address of a cell stored in all of the appropriate output queues, then not only does it result in the cell address being stored several times, but it is not easy to implement a mechanism to ascertain when a particular cell has been output on all the intended links.

A further disadvantage of the FIG. 2 arrangement is that the cells intended for the cell output link are treated on a First-In/First-out basis with respect to the output queues concerned.

An improved implementation of ATM switch is the Xunet switch described in "A High-Performance Queuing Engine for ATM Networks" (International Switching Symposium, 1992, C. R. Kalmanek, S. P. Morgan, and R. C. Restnick III). In this switch, each output port has its own memory area to which are fed the cells to be output on output streams associated with the port. However, the cells supplied to an output port are not treated on a First-In/First-Out basis but are, instead, scheduled according to some priority scheme. More particularly, each output port has 32 k output queues which are permanently present and are used as required to store cells associated with the same output stream, that is, with the same VPI/VCI combination. Each queue has a designated queue number QN and these queue numbers are formed into 16 different priority lists. Each queue number only appears once in all of the priority lists. A scheduler, in determining which cell to send next, looks at the priority lists and takes the queue number that is at the head of the list of the highest priority list with something in it. This queue number is then used to access the corresponding cell queue and the cell at the head of that queue is then output. The queue number is then recirculated back into the priority lists though it may, or may not, be returned to the same list from which is was taken.

The Xunet switch provides for flexible scheduling. However, in relation to multicasting, it causes each cell that is to be multicast to be replicated a corresponding number of times together with associated control data.

SUMMARY OF THE INVENTION

According to one aspect of the present invention, there is provided apparatus for receiving at least one input stream of packets each having a packet body and multicasting this stream as a plurality of output streams of packets by copying across the packet bodies of the packets of the input stream into packets of the output streams, the apparatus comprising:

input means for receiving packets and determining to which input stream each packet belongs, storage means for storing both the packet bodies of the packets received by the input means and a respective sequence data set for each input stream, each sequence data set serving to order the packet bodies received for the corresponding input stream in order of receipt, the storage means including an input control which upon a new packet body being stored, updates the sequence data set of the input stream to which the packet belongs as determined by the input means, and an output control for maintaining for each output stream a sequence position indicator referencing into the sequence data set of the corresponding input stream to indicate the next packet body to be sent on the output stream concerned, and output means for scheduling output on the output streams for communicating with the output control of the storage means to identify the packet body next to be output on the currently-scheduled output stream, and for retrieving and outputting the identified packet body on the scheduled output stream.

By this arrangement, the queues for the output streams are mapped onto the corresponding lists of packets received on the input streams, thereby providing efficient and flexible control structures.

Preferably, the packet bodies and sequence data sets are separately held in the storage means, each sequence data set comprising a linked list of packet-details entries each with a packet-body pointer to a respective corresponding packet body and a next-entry pointer to the next entry, if any, in the same list. In this case, upon a new packet body being stored, the input control sets up a corresponding packet-details entry in the appropriate linked list by, inter alia, setting the packet-body pointer of this entry to point to the newly stored packet body. Each sequence position indicator maintained by the output control for each output stream, points to the packet-details entry for the packet body next to be sent for the output stream concerned.

Advantageously, each packet-details entry has a multicast count item which is set by the input control, upon setting up of the entry, to the value of the number of output streams to be multicast from the input stream associated with the linked list of which the packet-details entry is a part. The output control is then arranged to decrement the count item of a packet-details entry each time the output means outputs the corresponding packet body, until the packet body has been sent on all relevant output streams whereupon the output control causes the removal of the entry from the corresponding linked list.

Generally, each input stream will be identified in the apparatus by a corresponding input identifier, the input means providing this identifier for each new packet received thereby to indicate to which input stream the packet belongs. Furthermore, the input control of the storage means will generally keep respective list pointers pointing to the tail of each said list and will maintain an association between each input identifier and the list pointer that points to the linked list associated with the input stream identified by the input identifier.

Preferably, each linked list has a tail entry devoid of packet-related information, and the list pointer kept by the input control is arranged to point to the tail entry of the corresponding linked list. In this case, the input control, upon a new packet body being stored, adds a new tail entry to the relevant linked list and uses the former tail entry of that list as the packet-details entry for the new packet body, the control means adjusting the list pointer for that list accordingly.

Advantageously, each output stream is identified in the apparatus by a corresponding output identifier, and the output means includes send-control means for effecting output scheduling of the output streams on the basis of the output identifiers and for indicating the next scheduled output stream by outputting the corresponding output identifier. In this case, the output control of the storage means will maintain an association between each output identifier and the sequence position indicator for the output stream identified by the output identifier; when supplied with an output identifier by the output means, the output control utilises this association to retrieve the packet-body pointer for the next packet body to be output on the output stream concerned.

Preferably, the send-control means comprises:

scheduling means for effecting output scheduling on the basis of the output identifiers, and for indicating the next scheduled output stream by outputting the corresponding output identifier, thereby removing it from the scheduling means, and, injection means for injecting output identifiers into the scheduling means, the injection means being responsive to the receipt by the input means of at least certain of the packets newly received thereat to inject into the scheduling means the output identifiers of at least some of the output streams associated with the input streams to which said certain packets belong;

the send-control means being such that an output identifier can be present only once at any one time in the scheduling means, and the send-control means further comprising recycling means responsive to the state of the sequence data set relevant the output identifier last output by the scheduling means, to return that output identifier to the scheduling means in the event that the sequence data set indicates there is at least one further packet body available for sending on the output stream concerned.

In a preferred embodiment of the invention:

the packet bodies are each stored only once in the storage means, the sequence data sets together have a respective entry for each packet body, each entry including a pointer to the corresponding packet body, and each entry being present only once in the sequence data sets taken together, and each output stream is identified in the apparatus by a respective output identifier and the output means includes send-control means for effecting output scheduling on the basis of the output identifiers, each identifier being actively present no more than once at any one time in the send-control means.

The present invention is particularly suited to the implementation of multicasting ATM switches (each packet then being a fixed-length cell).

BRIEF DESCRIPTION OF THE DRAWINGS

An ATM switch embodying the invention will now be particularly described, by way of non-limiting example, with reference to the accompanying diagrammatic drawings in which:

FIG. 5 is a table depicting a service rota for the switch core ports;

FIG. 6 is a block diagram of an adaptor card of the FIG. 3 switch.

FIG. 7 is a table depicting a service rota for the external switch ports of the FIG. 6 adaptor card;

FIG. 8 is a functional block diagram of a controller of the FIG. 4 switch core block;

BEST MODE FOR CARRYING OUT THE INVENTION

Architectural Overview

The ATM switch to be described hereinafter has a high-bandwith, N-port, switch core to which low-speed links are interfaced via multiplexer/demultiplexer units associated with respective switch core ports. The switch core services its ports cyclically to take in new cells for processing one at a time; there are thus two levels of multiplexing/de-multiplexing embodied in the architecture (except, of course, when N=1).

Figure 1:
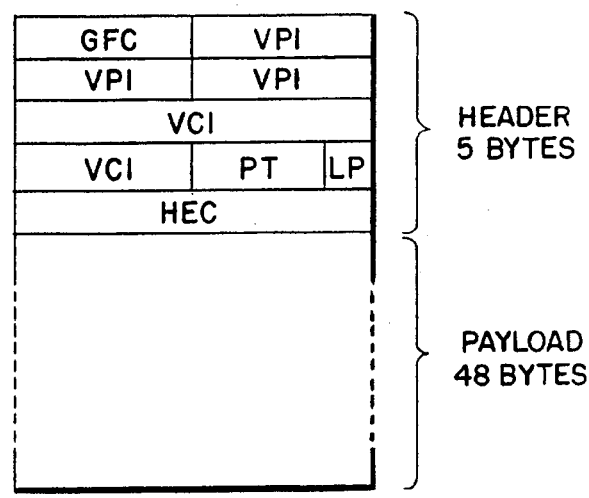
FIG. 1 is a diagram of the format of a standard ATM UNI cell for an AAL5 connection, this Figure constituting prior art and having already been discussed above.
Figure 2:
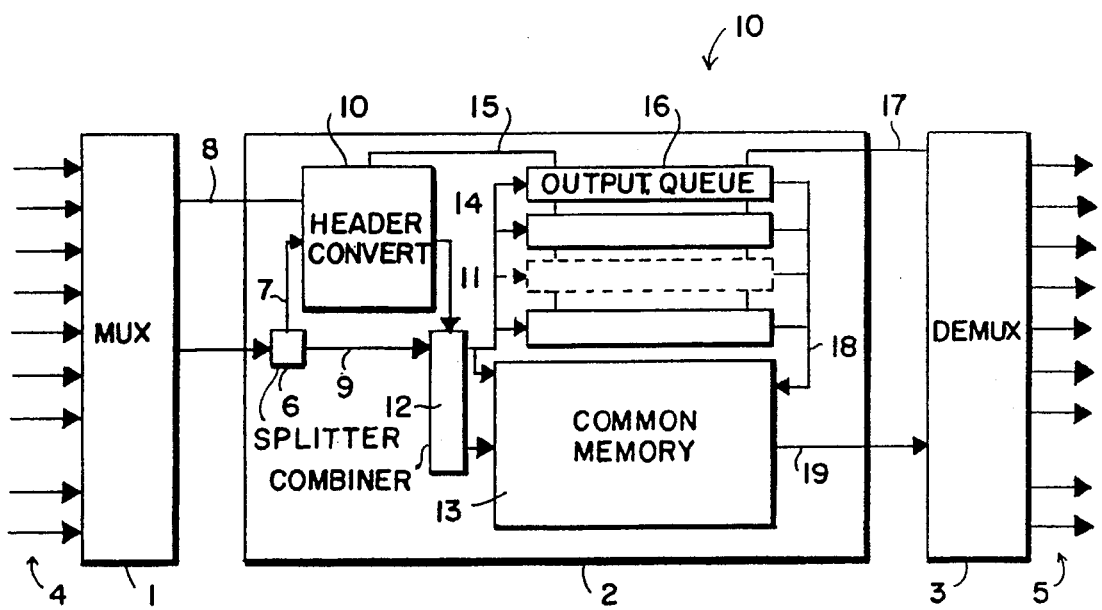
FIG. 2 is a diagram of a general ATM switch architecture in which low speed links are first multiplexed together before being fed to a port of the ATM switch core, this general architecture being known and having been already discussed above.
Figure 3:
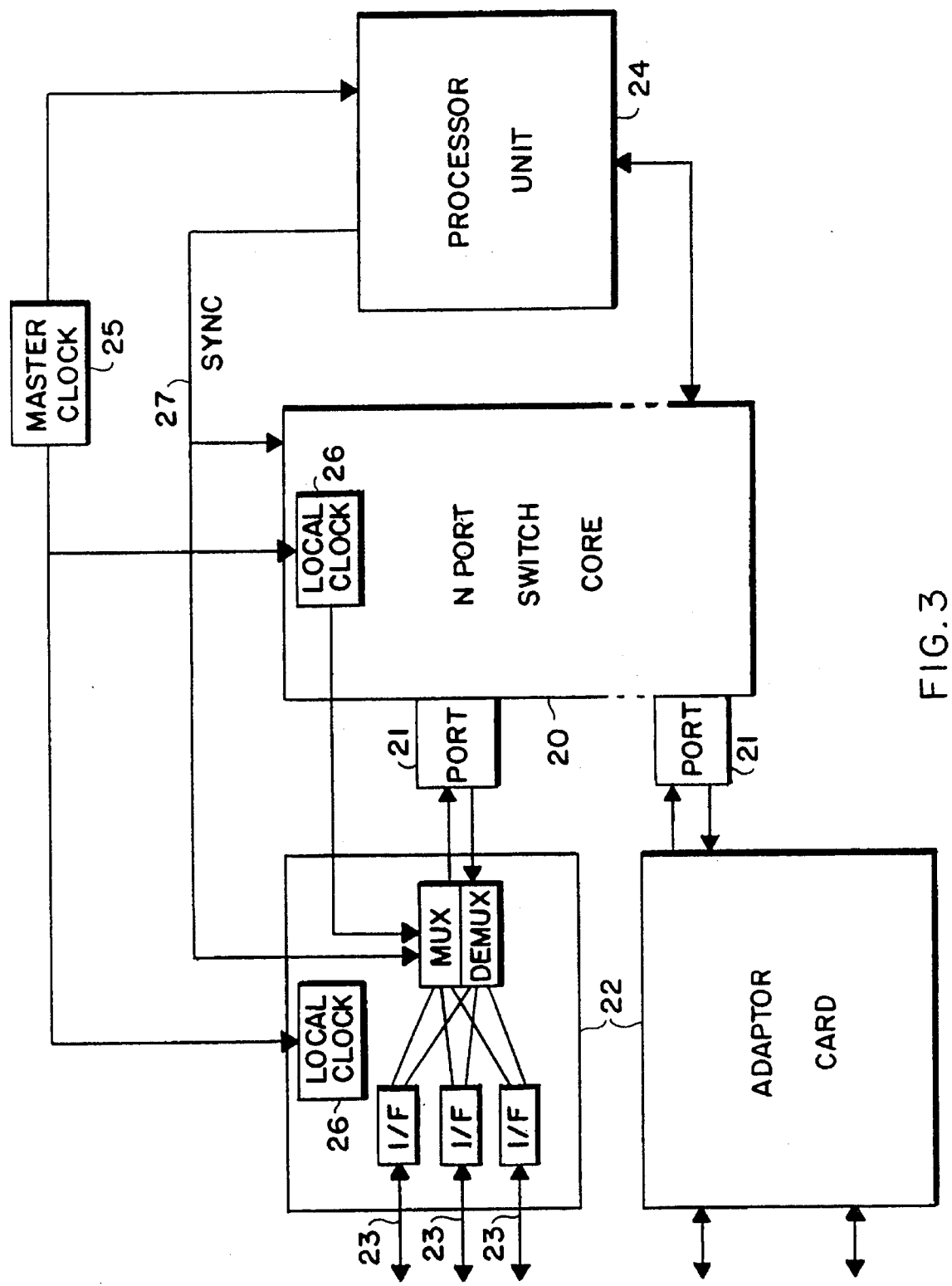
FIG. 3 is a top-level diagram of the ATM switch embodying the invention.

Referring more specifically to FIG. 3, at the top level the switch embodying the invention can be thought of as consisting of three main types of blocks. At the centre there is the N-port switch core 20, each switch core port 21 operating at the same predetermined speed of, for example, 622 Mb/s. Attached to each of the ports 21 is an adapter card 22. Each adapter card 22 interfaces a number of lower speed external switch ports 23 to a switch core port. Finally there is the processor board 24, which performs the signalling and virtual channel setup functions.

To give specivity to the switch description, the switch core ports are taken as operating at 622 Mb/s; however, it will be appreciated that this port speed is not critical to the present invention, higher and lower speeds being possible.

The architecture of the switch is a "shared everything" architecture. This means that there are no substantial resources dedicated to any particular port and buffering and intelligence are centralized. Thus the Adapter Cards contain almost no buffering and intelligence.

A common master clock 25 feeds clock signals to all three main switch blocks (switch core 20, adaptor cards 22, processor 24) and local slave-clock units 26 generate appropriate local clock signals; this arrangement ensures that the clock speeds have a constant predetermined relationship. A line 27 provides a global synchronising signal from the processor block 24 to the switch core 20 and adaptor cards 22 to synchronise operation of the blocks at start up.

The following three subsections describe each of the three above referred to main blocks in more detail.

N-Port Switch Core 20

Figure 4:
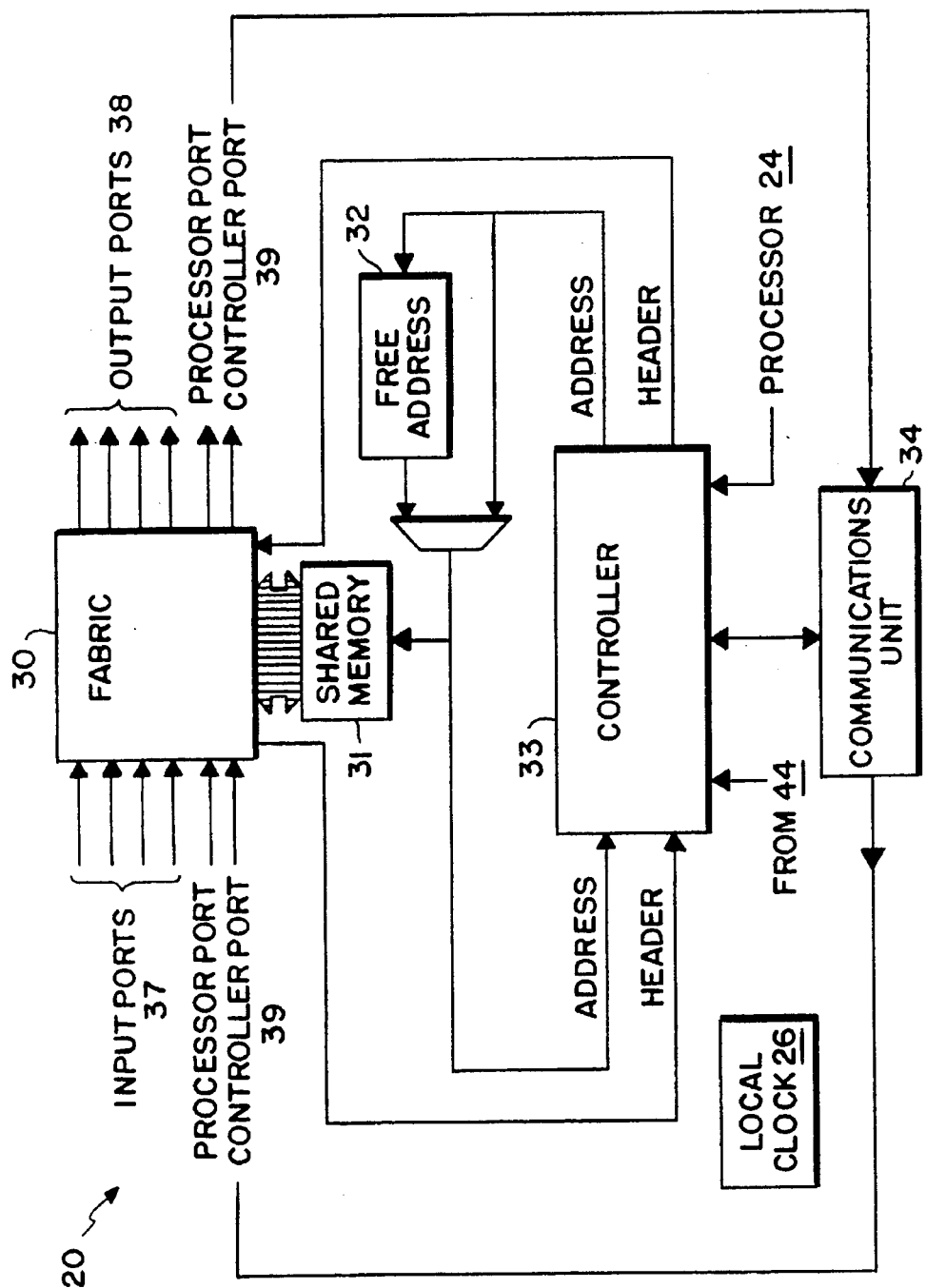
FIG. 4 is a block diagram of a switch core block of the FIG. 3 switch.

A block diagram of the N-port Switch Core 20 is shown in FIG. 4 and, as can be seen, the switch core comprises a switch fabric 30 with input and output ports 37, 38 which are generally paired and as such constitute the switch core ports, a shared cell-body memory 31, a free address list memory 32, a controller 33, and a communications block 34 for carrying out ATM adaption layer and other higher communication layers processing of cells intended for/coming from the controller (thereby enabling the latter to communicate over the network of which the switch forms a part).

At this level of abstraction, operation of the switch core is very simple. The N input ports 37 are serviced in strict order one cell at a time. When a cell comes in on one of the input ports the Fabric 30 writes the cell body into the Shared Cell Body Memory 31 at an address taken from the free address list memory 32. This address is also passed to the Controller 33, along with the header of the cell to which it relates. Because the input ports 37 are serviced in a fixed order, the Controller 33 can tell the source of the cell from the arrival time of the header.

The controller 33 stores and processes the headers and cell body addresses of incoming cells. It also makes decisions about which cell to send next on each output port 38 based on the queueing model and scheduling policies (to be described hereinafter). To send a cell the controller outputs the cell's header and the address at which the cell's body is stored. The fabric 30 reads the cell body out of the Shared Cell Body Memory 31, combines it with the header and sends the cell on an output port. As the output ports are also serviced in a fixed order, the destination of the cell is determined by the time at which the controller sends the header and address. As well as the main switch core ports (input/output port pairs 37,38) to which Adapter Cards 22 attach, the Fabric 30 also supports two slower ports. One of these ports 39 is used by the processor 24 to send and receive cells, the other is used by the controller to send and receive flow control cells via the unit 34.

The bandwidth of the Shared Cell Body Memory 31 and the Controller 33 is sufficient to accommodate receiving cells from all the input ports 37 and sending cells to all the output ports 38 at the maximum rate of these ports. The clocking of the constituent elements of the switch core 20 is controlled by the local clock unit 26.

Considering the timing of switch core operation in more detail, if the period between successive cell arrivals at the given main switch core port speed (622 Mb/s) is T, then for an N-port switch core, the fabric 30 must be capable of receiving N cells in each period T, that is, one cell from each main switch core input port 37. Similarly, the fabric must be capable of sending N cells in period T, that is, one cell for each output port 38. The fabric 30 must also be able to handle the transfer of cells through the processor and controller ports.

The fabric basically comprises a plurality of shift registers into and out of which cells are transferred, by shifting, through the main switch ports, these transfers going on at the same time for all ports; the transfer of cell body data between the shift registers of the fabric 30 and the shared memory 31 and of the cell headers to/from the controller 33 is then done by parallel transfer from/to the shift registers according to a predetermined cycle of transfers that deal with each port in turn.

The general process involved for each cell transferred in through a switch core port is thus that the cell header is first shifted into the fabric followed by the cell body; whilst the cell body is being shifted in, the cell header is transferred out to the controller and then during the subsequent transfer of the cell body to the memory 31, the header of the next cell for the port concerned is shifted into the fabric. As similar but opposite process is followed to output a cell.

So far as the transfers to the cell body memory 31 are concerned, the transfer cycle simply goes round each main switch port in turn (for example, if there are four input ports 37 and four output ports 38, the transfer cycle might first service each input port in turn transferring cell body data to the memory 31, and then service each output port in turn, transferring data from the memory 31 to the fabric). The transfer of cell body data between the memory 31 and the shift registers associated with the controller and processor ports is handled by the fabric in predetermined redundant portions of the cell transfer cycle for the main switch core ports.

The transfer of cell headers between the fabric 30 and the controller 33 may follow a similar transfer cycle as for the cell body transfers provided that the controller 33 receives and can output headers sequentially (the controller effecting its processing sequentially). Thus, the controller and processor ports must be allocated their own slots in an overall port service cycle followed by the controller. Of course, the controller and processor ports are not serviced as frequently as the main switch core ports and generally, if the processor and controller ports run at $1/n^{th}$ of the speed of the main ports, then the processor and controller ports will be serviced only once every n services of the main ports. The result is an overall port service cycle such as illustrated in FIG. 5 for a switch core having four main ports P1 to P4, this cycle applying both to the input of headers to the controller 33 and to the output of headers from the controller (in fact, the cycles need not be the same for input and output, but generally this will be the case).

The cell headers passed to the controller 33 are associated with their corresponding cell bodies by the addresses that are used to store the cell bodies in the memory 31, these addresses being stored with the header data in the controller 33. It will be appreciated that the address at which a cell body is stored must be supplied to the controller 33 at a timing appropriate to ensure it is stored with the correct header.

As is explained hereinafter, certain of the cells supplied through the main switch core ports may be empty cells (or, more precisely, cells that are to be ignored), this condition being indicated by the values of VPI and VCI being set to zero in the cell header. The presence of such a cell does not alter the process of transferring the cell body to the memory 31 or cell header to the controller 33; however, upon the controller 33 finding that the VPI and VCI of the cell header are zero, it simply passes the associated address at which the cell body has been stored, back to the free address list 32, it being unnecessary to take any action in the memory 31 itself.

Adapter Card 22.

Each Adapter Card combines a number of external input/output port pairs into one switch core port. The external input/output ports on one Adapter card may consist of any combination of links provided the bandwidth of these links sums to less than the switch core port speed. For instance, if the switch core port speed is 622 Mb/s, an Adapter card might contain twelve 51 Mb/s ports, or four 155 Mb/s ports or a mixture of speeds such as three 155 Mb/s, one 100 Mb/s and one 51 Mb/s port.

The Adapter Card's operation is very simple. For the most part it does not look at the cells it handles. One exception to this is the Header Error Check (HEC) field of each cell, which is generated by the Adapter Card for cells going out and checked by the Adapter Card for cells coming in. If the HEC fails for an incoming cell then the Adapter Card turns the cell into an empty cell by setting the VPI and VCI fields of the cell to zero.

An example of an Adapter card 32 is shown in FIG. 6 which is intended to interface five external low-speed ports A to E to one switch core port. Only the port A components are shown for reasons of clarity. The adaptor card 22 comprises the following elements:

a respective physical layer/framer unit 40 for each port A to E. The units 40 carry out the header error check functions mentioned above.

a small (two cell) input FIFO 41 for the input side of each port A to E; these FIFOs help to match the rates of the input ports to the switch core port.

a respective unit 42 for detecting when the contents of a corresponding one of the input FIFOs 41 falls below an amount equal to one cell.

a small output FIFO 43 for the outside side of each port A to E; these FIFOs help to match the rate of the switch core port to that of the output ports.

a respective unit 44 for detecting when the contents of a corresponding one of the output FIFOs 43 exceeds an amount corresponding to one cell.

a Time Division Multiplexer 45 which multiplexes cells from each of the input ports into a switch core input port 37. Cells are sent cyclically in a predetermined port order (discussed below) that is held in an input port rota unit 46; the start of the port rota cycle is dictated by the global synchronisation signal.

a Time Division Demultiplexer 47 which takes cells from the corresponding switch core output port 38 and sends them to the appropriate output port A to E. Cells arrive in a predetermined order that is held in a programmable output port rota unit 48 that is synchronised to the global synchronisation signal.

a local clock unit 26.

Due to the close functional association of the multiplexer 45 and demultiplexer 47 on the one hand, and the associated switch core port on the other, the multiplexer 45 and demultiplexer 47 are clocked by clocking signals supplied from the switch core port to provide synchronised transfer of cells to/from the switch-core fabric 30.

The switch core port is run at a speed slightly greater than the cumulative speeds of the external ports associated with it (the output side of these latter ports being clocked from the local clock unit 26 which is set accordingly). One reason for doing this is to accommodate variation in the actual speed of the links connected to the external ports from their nominal values. This overrunning of the switch core port means that the input FIFOs 41 are being emptied faster than they are being filled. To deal with this, whenever the contents of one of the FIFOs 41 fall below an amount corresponding to one cell, the associated unit 42 signals the multiplexer 45 causing an empty-cell insertion unit 49 to generate and send an empty cell to the controller 33 in the appropriate time slot; this allows the input FIFO to fill again.

Conversely, the output FIFOs 43 are being filled faster than they can be emptied. This is handled by the appropriate unit 44 on detecting that the contents of its associated output FIFO 43 is more than one cell, providing a corresponding indication to the controller 33. If this indication is present upon the controller 33 preparing to send a cell to the corresponding external port, then the controller will send an empty cell instead to the external port. A unit 50 of the demultiplexer 47 is arranged to detect and delete this empty cell, allowing the FIFO 43 to drain.

Considering next the order of servicing of the external ports as established by the port rotas stored in units 46 and 48, clearly the higher speed ports will need servicing more frequently than the lower speed ones. In general terms, the cell period of the lowest speed port sets the overall cycle time of the port rota, this lowest speed port only needing to be serviced once during the cycle whilst the higher speed ports will need servicing two or more times. FIG. 7 illustrates a possible port rota for the FIG. 6 adaptor card. During each cell period T of the associated switch core port, one cell is transferred to/from the switch core port from/to the external port A to D next on the port rota.

Processor

The processor unit 24 performs virtual channel connection setup and management, by receiving requests for connections and manupulating data structures in the controller 33. The processor also initialises controller data structures at power up.

To accomplish these functions the processor unit 24 has two interfaces to the switch core. The first is a cell interface through the processor input and output ports of the switch fabric; this allows the processor to send and receive cells, just as it would be able to do were it attached to one of the input/output ports on an adapter card.

The second interface is directly with the controller itself (see FIG. 4) to allow the processor to access internal data structures in the controller, so that it can set up and modify virtual channel data. The processor accesses the controller while the controller is idle because an empty cell has been received. To ensure that sufficient empty cells are received, the switch core is run slightly faster (about 10%) than the rate needed to cope with the input and output ports with the result that the adapter card FIFOs 41 periodically drain below their one-cell thresholds, causing the empty cell insertion units 49 to operate.

Although the processor has full access to all the data structures in the controller, it does not have any access to the shared cell body memory.

The general operation of the processor unit 24 in effecting initialisation and connection set up is in accordance with known practices in the art and will not therefore be further described. The identity and nature of the actual controller data structures set up and modified by the processor unit 24 will become apparent from the description of the controller that follows.

Controller Concepts and Overview

Before describing in detail the data structures and processes used to implement the controller 33, the main concepts involved in its operation will first be previewed with reference to FIG. 8. As will become apparent, the way in which multicasts are handled in the controller is central to its overall architecture.

Overall External Port Rota

It is essential for the controller 33 to know from which external (adaptor card) port a cell header has been received because the (VPI+VCI) information in each header is only unique on a per-link basis; the external port identity is thus necessary to uniquely identify a cell header as relevant to a particular instance of communication through the switch. One way of informing the controller of the relevant external port identity would be to arrange for the adaptor cards to tag each cell header. However, it is possible to use a different approach for the present controller because both the order in which each adaptor card services its associated external ports and the order in which these adaptor cards are serviced through the corresponding switch core ports, are predetermined. Thus, in the present controller, the external port identity associated with a cell header is determined by the controller on the basis of when the header is received. More particularly, an external port rota is derived indicating the order in which cell header will be received from the external ports of all the adaptor cards connnected to the switch core; thereafter, the controller 33 accesses this rota in coordination with the operation of the adaptor-card multiplexers 45, the controller 33 and multiplexers 45 having been initially synchronised by the global synchronisation signal previously referred to. The external port rota itself is a combination of the switch-core port cycle shown in FIG. 5 (showing in which order cell headers are passed from the switch-core ports to the controller), and the external port service cycle for each adaptor card (see FIG. 7). This combination is effected by taking the next entry on the external-port service cycle for an adaptor card, each time the corresponding switch-core port appears on the switch-core port cycle. Thus for a switch-core having the FIG. 5 port cycle with switch-core port P1 connected to an adaptor card having a service cycle as shown in FIG. 7, successive services of port P1 in the FIG. 5 cycle will be associated with successive ones of the external ports A to E according to the FIG. 7 cycle.

The external port rota is, of course, dependent on the port make-up of the adaptor cards connected to the switch core. For this reason, the external port rota is determined at start up of the switch by the processor unit 24 interrogating each adaptor card to discover its external-port service cycle. The processor unit 24 then stores the rota in an appropriate data structure 60A of the controller 33 enabling the controller to access the rota as required.

The external port rota is not only needed by the controller to determine the source of each new cell header it receives, but also to coordinate its output of headers with the predetermined order in which the external ports are made available for switch-core output (this being determined by the combined operation of the fabric 30 and the de-multiplexers 47 on the adaptor cards). As already noted, the order in which ports are serviced for input and output need not be the same but in general they will be. In the present case, the same general form of external port rota is used for output from the controller as for input the external input-port and output port rotas being respectively referenced 60A and 60B in FIG. 8.

Master and Output VCNs

In order uniquely to identify a flow of associated cells in the switch, a VCN (virtual channel number) is used by the controller. Every input virtual channel has its own VCN, called a "master VCN" and every output virtual channel has its own "output VCN". For each unicast connection through the switch, there is thus one master VCN and one output VCN, whilst for each multicast connection group, there is one master VCN and a plurality of output VCNs. For the unicast case, it is convenient to use the master VCN also as the output VCN; indeed even for the multicast case, it is convenient to use the master VCN also as the first one of the output VCNs.

The master VCN is derived from the (VPI+VCI) of a cell header in combination with the identity of the external port providing the cell. Each cell header passed to the controller 33 will first have its master VCN determined (see block 61 in FIG. 8) and this master VCN is then used to control queuing of the header in the controller. The output VCNs are allocated by the processor unit when setting up a connection and are used for effecting output queuing and scheduling. The output VCNs are associated with their corresponding master VCN in appropriate data structures of the controller enabling translation in both directions, that is, master VCN to corresponding output VCNs, and output VCNs to corresponding master VCN.

Two Controller Paths

As illustrated in FIG. 8, there are two paths in the controller 33, one for queuing cell details (that is, for each cell, certain cell header data and the corresponding cell body address), and the other for queuing and scheduling output VCNs to control the output of cell headers from the controller 33.

Cell Details Path

This path involves, after the lookup of the master VCN of a cell header, a policing block 62 for checking whether the cell details for the cell concerned can be stored or should be discarded, a cell-details queuing block 63, and an output header generation block 64 that receives from block 63 cell details for the next header to be output, generates the new header (including looking up the new VPI+VCI), and outputs the new header and the address of the corresponding cell body. The cell details of cells with the same master VCN (i.e. cells from the same VC source) are all queued in the same LIST 65 stored in the block 63, the cell details of each cell being stored as a respective list entry. The list 65 is created, empty, by the processor unit upon set up of a connection. For each list, a cell-details input control 66 maintains a producer pointer 67 pointing to the tail of the list (which is where entries are added), and an empty flag indicating whether or not the list 65 is empty.

The head of each list 65 is the cell-details entry for the oldest cell still to be sent out in respect of the incoming cell stream for the master VCN concerned. For unicast VCs, the head list entry identifies the next cell to be output for the sole output VC; this head entry is pointed to by a consumer pointer 68 maintained for the output VCN concerned by a cell-details output control 69. For multicasts, there are of course a plurality of output VCs for each input stream, and it is necessary to track for each output VC its progress along the corresponding list 65 in outputting cells; this is achieved by providing a respective consumer pointer 68 associated with each output VCN. In effect, a respective cell-details QUEUE 70 is kept for each output VCN, this queue being mapped onto the list 65 for the associated master VCN with the head of the queue being pointed to by the corresponding consumer pointer 68 and the tail of the queue being pointed to by the producer pointer for the master VCN concerned. This concept of having a respective cell-details list 65 associated with each master VCN, and respective queues 70 mapped onto the list for the associated output VCNs, is an important one in the operation of the cell-details queueing block 63.y Upon the head entry of a queue 70 being output by the output control 69 to cause the output of a cell for the corresponding output VCN, the consumer pointer 68 for the queue 70 is adjusted to exclude that entry from the queue. When the head entry of a list 65 has been excluded from all the queues 70 mapped onto the list, this entry is freed and the output control 69 also causes the corresponding cell body address to be put back on the free address list 32.

Output VCN Send Control Path

The order of output of cells from the switch through the appropriate external switch ports is determined by a send control path that operates on the basis of the output VCNs set up for the output virtual channels. As will be more fully described hereinafter, output VCNs are injected into this path by an output-VCN send kickoff block 82 that is itself "kicked" by the input-control 66 of the queuing block 63 whenever a list 65 changes from an empty to a non-empty state. Kicking the block 82 involves passing the block the master VCN of the list concerned; the kickoff block 82 converts this master VCN into the output VCNs associated with the master VCN—these output VCNs being those having associated queues 70 mapped onto the list 65 that has just become non-empty. These output VCNs thus represent the Virtual Channels for which a cell has now become available for sending. The kickoff block 82 injects these output VCNs into the send control path (in particular, into an eligibility control block 77). Once an output VCN has been injected into the path, it will circulate in the path, periodically prompting the sending of a cell, until the corresponding cell-detail queue 70 indicates that there are no more cells available for sending in respect of the output VCN concerned.

The main components of the send control path are the eligibility control block 77 and a scheduling block 75. The actual scheduling of cell output is effected by the scheduling block 75 that maintains a respective queuing structure (see block 76) for each external port; each of these queuing structures is used to queue the output VCNs of all the output virtual channels that are associated with the corresponding external port and for which there is at least one cell eligible for sending. A virtual channel has one or more cells eligible for sending if there is at least one entry in the corresponding output VCN queue 70 (unless temporarily blocked from being sent—see explanation of "stop bit" below) and the virtual channel has credit for sending (as explained below) where such credit is required.

It is the job of the eligibility control block 77 to determine when an output virtual circuit has one or more eligible cells and when it so determines, it passes the corresponding output VCN onto the scheduling block 75 for queuing on the appropriate queuing structure. These queuing structures can thus be thought of as queuing "eligible" output VCNs. The queuing of the eligible output VCNs on the appropriate queuing structure is achieved by storing in a table 81 in block 77 the identity of the appropriate queuing structure for each output VCN, this information being passed to block 75 with each output VCN.

The operation of the eligibility control block 77 and associated blocks 80, 82 will be considered further later; for the moment, however, it will be assumed that the queuing structures of the scheduling block 75 have been populated with eligible output VCNs.

The scheduling block 75 includes a scheduler 78 whose operation is coordinated with the operation of the fabric 30 and adaptor-card demultiplexers through synchronised access to the external port rota 60. The scheduler 78 examines the output VCN queuing structure for each external port in the appropriate slot of the rota 60, and outputs the VCN (if any) of highest priority for that structure on line 79 to the output control 69 of the cell details queuing block 63. The output control 69 then uses the consumer pointer 68 for the VCN concerned to access the cell-details entry at the head of the corresponding cell-details queue 70 and passes these details to the output header generation block 64 where the new header is generated; meanwhile, the output control 69 adjusts the consumer pointer 68 for the VCN concerned to point to the next entry in the corresponding list 65.

An output VCN will only appear once in the queuing structure 76 appropriate for the external port concerned, regardless of how many eligible cells there are for the corresponding VC. Each time the scheduler 78 outputs a VCN, it is removed from the corresponding queuing structure. The output control 69 on outputting cell details on an output VCN, passes this output VCN to the eligibility control block 77 so that the latter can decrement the credit for that output VCN; at the same time, if the output control 69 determines that there are one or more further cells ready for sending on the corresponding cell-details queue 70, then it will so inform the eligibility control block 77 by passing it a "more-cells" indication. If the eligibility control block 77, after updating, has further send credit recorded for this output VCN (or if no credit is required), then the output VCN is passed back to the scheduling block 75 where it rejoins the corresponding queuing structure; however, if no send credit is immediately available (and is required), then the eligibility control block 77 awaits the receipt of such credit from a credit provision block 80 before passing on the output VCN to the scheduling block 75. The credit status of each output VCN is held in the table 81 kept by the eligibility control block 77.

If the output control 69, after outputting cell details for a particular output VCN, determines that the corresponding queue 70 is empty, it does not pass the "more cells" indication back to the eligibility control block 77. However, if at the same time, the output control 69 determines that there are no entries remaining in the corresponding list 65 (all queues 70 relevant to the list having been emptied), it signals this to the input control 66 to cause the empty flag for the list to be set.

From the foregoing, it can be seen that once the eligibility control block 77 has been signalled by the kickoff block 82 that a new cell has arrived on the queues 70 of particular output VCNs, each of these output VCNs gets circulated around between block 77, the scheduling block 75 and the output control 69 until the latter determines there are no more eligible cells for that output VCN (it being appreciated that new entries may be added to the relevant queues 70 whilst the output VCNs are awaiting scheduling in respect of each entries). The non-availability of send credit may temporarily halt this process but as soon as new credit becomes available, the process recommences.

When an output VCN ceases to be circulated (because there are no more entries available in its queue 70), then it must await re-injection into the send control path by the kickoff block 82 before it can be rescheduled for sending.
Quality of Service The switch offers connections with three different qualities of service, these are:
Guaranteed Bandwith with low maximum latency (GB0)
Guaranteed Bandwith with higher maximum latency (GB1)
Best Effort (BE)

Figure 9:
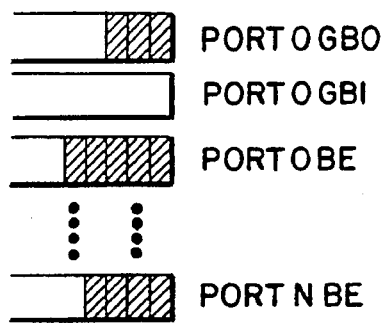
FIG. 9 is a diagram illustrating port queues kept by a scheduler of the FIG. 8 controller.

To this end, each external port queuing structure (block 76) in the scheduling block 75 actually comprises three queues, one for each quality of service, and each eligible output VCN is added to the appropriate queue (the identity of this queue being held in table 81 of the eligibility control block and being passed to block 75 with the output VCNs). As will be appreciated, this results in a fair queuing policy within each class of service. FIG. 9 illustrates the external-port output VCN queues maintained by the scheduling block and shows the provision of three queues per external port in the case of an external port identified as Port 0. Each time the scheduler 78 examines an external-port queuing structure in the corresponding slot of the rota 60, it will take the output VCN at the head of the highest priority non-empty queue, the priority order of the queues being GB0, GB1, BE.

For the Guaranteed Bandwith Services, an appropriate amount of the shared memory 31 is reserved for each input VC subject to such service. furthermore, as will be described hereinafter, for the Guaranteed Bandwidth services, a credit control scheme is operated based on token buckets. Should a Guaranteed Bandwith Source exceed its guarantee (that is, it produces more cells per unit time than the switch has guaranteed to handle), then the eligibility control block will either temporarily halt the sending cells for that VCN (shaped output) or will temporarily treat the connection as a Best Effort connection (unshaped output).

Best Effort traffic may or may not be flow controlled. In the case of flow controlled traffic, a fixed amount of memory will be allocated to each input VC and credit will be issued to upstream nodes based on the amount of this memory that is free. For each output VCN a count will also be maintained of the credit that downstream nodes have advertised. This upstream/downstream credit control is managed by a flow control block 85, the credit count for a flow-controlled output VCN being kept in the present node by the eligibility control block 77. When this credit count becomes zero, the eligibility control block prevents the VCN being passed to the corresponding scheduler queue, thereby halting transmission.

Best Effort connections which are not flow controlled can have an arbitrary amount of memory allocated to them. If there is contention on the output and this memory is exhausted then cells will be dropped.
Multicasts, Empty Flags and Stop Bits As described above, in the case of a multicast (multiple output VCs for one input VC), the corresponding cell-details list 65 has several queues 70 mapped onto it, each corresponding to a particular output VCN. Again, as already described, the output control 69 for the queuing block 63 does not cause the empty flag of a list 65 to be set until all the queues 70 associated with the list 65 are empty. The reason for this is that the change of the empty flag from its set to unset state upon arrival of a new header whose cell details are to be queued on the list 65, causes the input control 66 to "kick" the send kickoff block 82 resulting in injection into the send control path of all the output VCNs associated with the list; if the empty flag of a list were to be set upon only one associated queue 70 becoming empty, then the send kickoff block 82 could be kicked to inject output VCNs into the send control path when some of the output VCNs were still present in the path. The result of this would be unfair output scheduling.

During switch operation, it may happen that a new list entry is added between the time:

(i) one of the queues becomes empty following consumer pointer adjustment to exclude from the queue 70 the head entry of the list 65 after this entry has been used for outputting a cell header for the output VC concerned, and (ii) another of the queues has the same list entry excluded by consumer pointer adjustment, again after the entry has been used for outputting a header for the output VC related to that queue.

In these circumstances, the second of the aforesaid queues will not be empty when it excludes the entry that made the first of the queues empty and so the empty flag will not be set by the output control 69, even if all other queues are empty. It will be apparent that queues that have become empty under these cirucmstances may not get a chance to re-enter the scheduling process because new cell-details entries could continue to be added to the list in a way that the aforesaid non-empty list always remains such. Because there will be a finite limit to the amount of memory allotted to a particular input VC, in due course, cells will be lost.

In order to avoid this problem, each cell-details entry in a list 65 has an associated "stop-bit". If in a multicast case, a queue 70 becomes empty, the output control 69 will set the stop bit of the head entry (i.e. the entry just excluded from the empty queue). Upon any other queue on the same list excluding this entry (because a cell header based on it has been sent out for the output VCN concerned), the corresponding output VCN is not re-circulated back to the eligibility control block 77; the queue has been effectively "stopped". However, once all queues have used the entry whose stop bit is set, that entry is removed and the VCN send kickoff block is kicked by the output control 69 (see "un-stopped" kick in FIG. 8) with the corresponding master VCN to re-inject all the relevant output VCNs into the send control path.
The Output VCN Send Kickoff Block The general functionality of the kickoff block 82 has already been described but several addition points are worthy of comment at this stage. The block 82 comprises a multicast expander 83 and an output circuit 84. The multicast expander 83 is arranged to make available all the output VCNs corresponding to a particular master VCN when the expander 83 is "kicked" with that master VCN. The multicast expander 83 is (re)programmed with appropriate data from the processor unit each time a connection is set up or taken down so that it is continuously kept up to date and able to relate every current master VCN with the corresponding output VCNs. The output VCNs made available by the expander 83 are passed one by one by the output circuit 84 to the eligibility control block 77.

The Kickoff block 82 is implemented in a way enabling it to absorb all the kicks it receives whilst not having to complete the processing associated with each kick before it can receive another. This can be done, for example, by including an input FIFO for the kicks or possibly by providing an output VCN FIFO; generally, what is needed is the provisions of FIFO buffering at a point upstream of where the block 82 needs to effect per output VCN operations, such as transfer to the eligibility control block 81.

The importance of this arrangement and of the circumstances under which the block 83 is kicked is that the expansion inherent in multicasting is dealt with in a way that produces the minimum processing strain on the controller. Thus, each master VCN and output VCN only ever has one occurence in block 83 and this permits particularly efficient memory utilisation to be effected. Furthermore, the per output VCN processing associated with any particular kick does not have to be finished before the next kick can be received.

Controller Implementation Details

A more detailed description will now be given of the main components of the controller.

Master VCN Lookup Block

As already described, when a cell arrives at the switch core, its header is passed to the controller 33; here, it is initially handled by the master VCN lookup block 61. On receipt at the block 61, the header consists of the following fields:

Genetic Flow Control (GFC), 4 bits,

Virtual Path Identifier (VPI), 8 bits,

Virtual Channel Identifier (VCI), 16 bits

Payload Type (PT), 3 bits, and, a bit which for AAL5 connections forms an End of Packet bit (EOP).

Note that by this time the fifth byte of the header, the Header Error Check (HEC) has been removed because it has been verified in the appropriate adapter card. A failed HEC will have resulted in the cell being marked as empty (VPI= VCI=0).

The cell body address is also passed to the VCN lookup block 61 along with the corresponding cell header.

The following operations are performed on the header by block 61:

the cell is discarded if its VPI and VCI are set to zero, this discarding being done by returning the cell body address to the free address list 32;

the GFC is discarded;

the PT and EOP are extracted for storage with the cell body address so that the output header can be generated correctly, these items being referred to herein as the "cell details";

the VPI and VCI are concatenated with a number (port number) identifying the external port on which the cell was received to produce a unique identifier (herein the long channel identifier) for the connection which the cell is associated; the long channel identifier is then used to look up the master VCN associated with the cell.

It is this fourth function which is the main one for the block 61 and will now be described in more detail.

The VPI and VCI information used to derive the long channel identifier for a cell are directly available from the cell header; the port number identifying the external input port on which the cell has been received is derived in the present embodiment from the external input-port rota 60A, each external port appearing in the rota having an associated unique number.

Once the input port number has been obtained it is concatenated with the VPI and VCI to give the long channel identifier which is about 30 bits long (the exact length will depend on the number of ports the switch can have). This number is then used to find the master VCN of the connections with which the cell is associated.

As it is impractical to have a simple lookup of a number this size, a multistage lookup process is used.

Figure 10:
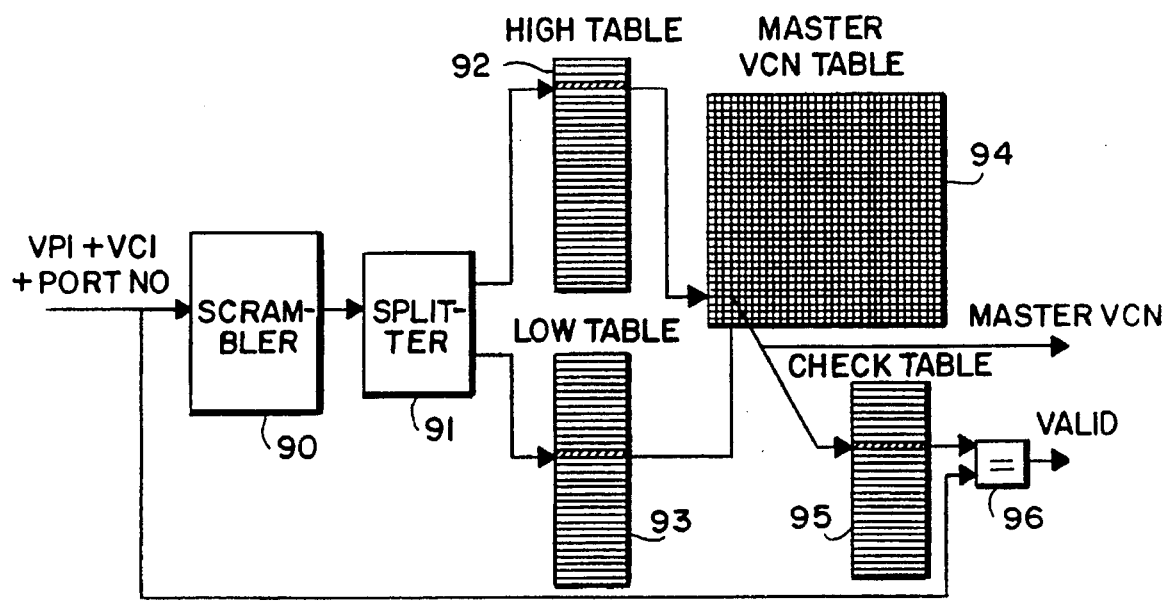
FIG. 10 is a diagram of a master VCN lookup block of the FIG. 8 controller.

The lookup process comprises the following steps:

1. The long channel identifier (VPI+VCI+port number) is scrambled in scrambler 90 (see FIG. 10). The scrambler may be of standard form such as one based on a linear feedback shift register where the channel identifier is used as a seed word for the linear feedback shift register which is then shifted by the word length to give the scrambled output word.

2. The scrambled long channel identifier is divided into two parts by splitter unit 91. One part (the top part) is used to look up a "row index" in a "high table" 92 and the other part (the bottom half) is used to "look up" a "column index" in a "low table" 93.

3. The "row index" and "column index" are then used to access a two-dimensional table 94 which contains the master VCNs.

4. Finally, the master VCN is used to look up a long channel identifier in a check table 95, this identifier corresponding to the one that should have been used in step 1 if all is working well; the looked up identifier is compared against the actual original long channel identifier in comparator 95 to check that the process of steps 1 to 3 did not give a false result (if it did, the cell is discarded by adding the cell body address to the free address list).

The reasons for performing each of the steps of the lookup process are as follows:

Step 1. The need to scramble the long channel identifier arises because it is likely that most long channel identifiers for cells from the same link will have identical top halves (probably zero). Unless the long channel identifiers are scrambled, they would therefore all index to the same index in the high table 92 allowing only one row of the master VCN table 94 to be used. Scrambling distributes differences across the whole identifier, thus improving the utilisation of both the row and column tables, allowing the master VCN table to be used more efficiently.

Step 2. The scrambled long channel identifier is split in half because it is impractical to look up a 30-bit number, while it is quite practical to look up a 15-bit number (a 32K entry table is needed). Splitting the number into more pieces would result in three 1K tables. While this appears at first to be attractive, the resulting tables are too small to allow many VCs to be supported so this option would only be suitable in special situations.

Step 3. The result of the high and low table lookups are used to index the master VCN table because, although these two results uniquely identify the connection, the results are sparse. This is because the process does not work well when the master VCN table is more than about a quarter full. Therefore using the high and low tables results directly would give a VCN space four times bigger than it needs to be and would push up the memory requirements of all the per VCN data structures in the rest of the controller accordingly.

Step 4. The long channel identifier check is done because it is possible that cells might arrive on VCs that have not been set up. If the check was not performed and such a VC happened to index a valid master VCN, then its cells would be treated as if they had come in on the VC corresponding to that master VCN.

The foregoing lookup process allows fast lookups of large numbers of VCNs to be performed at low cost in hardware. For instance 8000 master VCNs associated with up to 64 external ports would require a 32K×8 high table, a 32K×8 low table, a 64K×13 master VCN table and a 8K×30 check table.

When a VC connection is set up, the processor unit 24 calculates the entries to put in the various tables of the master VCN lookup block 61. In doing this, it is possible that the processor unit might find that a particular VC will not fit into the existing tables without conflict with a previously set up VC (in particular, the scrambled long channel identifiers of the new and previous VC both map into the same master VCN table entry). In this case, the processor unit 24 is arranged to change the scrambling function used by the scrambler 90 and to rearrange the tables so that a conflict no longer exits. In order to support this operation, the high, low and master VCN tables are double buffered, allowing lookup to continue in the active table while the processor unit rewrites the inactive table.

Policing Block

The role of the policing block 62 is to decide when cells should be dropped. The need arises to drop cells if they are arriving on a VC faster than they are being sent. This will only occur in two circumstances, namely:

best effort connections are contending for an output;

a guaranteed bandwidth connection has exceeded its guarantee.

The mechanism used to decide whether to drop cells is described below.

As already mentioned (see "Quality of Service" section), when a new VC is set up through the switch, a fixed amount of memory from the shared memory 31 is allocated to the input side of the VC in dependence on the quality of service to be provided. The amount of memory allocated is known as the "allocated memory utilisation" or "allocated MU" for the input VC concerned. The policing block 62 keeps a record of the allocated MU of each input VC by reference to the corresponding master VCN.

The shared memory 31 can be considered as divided into two areas: the reserved area, whose size is equal to the sum of all the allocations, and the unreserved area, which makes up the rest. An input VC may be allowed to exceed its allocated MU and store cells in the unreserved memory area under certain conditions. It should be noted that the memory is not actually split into separate areas, it just behaves as if it were.

The policing block 62 maintains a record of the amount of memory from the shared memory 31 that is currently being used in relation to each master VCN; this memory amount is known as the current memory utilisation, or current MU, for each master VCN. The current MU of a master VCN is incremented by block 67 when it receives a cell header for the master VCN concerned, and is decremented when the output control 69 of the queuing block 63 indicates that a cell has been sent on all relevant output VCNs and the corresponding area of the cell body memory can be freed (by the cell body address being placed on the free address list 32).

When a header with a particular master VCN arrives at block 62, indicating the arrival of a new cell body in the memory 31 for a corresponding VC, the policing block 62 must decide whether or not to drop the cell. It does this using the following criteria:

if the master VCN's current MU is less than is allocated MU, the cell is not dropped and the current MU is incremented;

if the VCN's current MU is greater than or equal to the allocated MU, the cell will be dropped unless the amount of space used in the unreserved memory region is less than some predetermined threshold. If the cell is not dropped its current MU is incremented as is the record of used space in the unreserved memory region.

In order to maintain the record of current used space in the unreserved memory area, the policing block 62 must also examine the allocated MU of a master VCN when a cell has been sent out on all associated output VCNs and the corresponding shared memory address has been freed. If the current MU of the master VCN is, before decrementing, greater than the corresponding allocated MU, the record for the current used space in the unreserved area must also be decremented to take account of the freed memory space.

It should be noted that the monitoring of current MU is the only mechanism in the switch which can drop cells. This means that once cells have passed this check they can never be dropped.

It should also be noted in relation to guaranteed bandwith services that the switch does not directly monitor the traffic at its input in order to establish whether a VC is exceeding its guarantee and so determine whether cells have to be dropped. Instead it relies on the indirect mechanims of monitoring current MU to establish when a VC is trying to exceed its bandwith guarantee.

For AAL5 connections the controller can see the End of Packet (EOP) bit in the cell header. Thus, provided the controller is informed at connection set up whether a particular connection is an AAL5 connection, the controller can decide, after dropping a cell on an AAL5 connection, to drop all subsequent cells in the same packet. The advantage in doing this is that if they are not dropped here, these cells will cause unnecessary traffic and related processing as they will in any case be dropped at the destination by the protocol layer responsible for ensuring that only complete packets survive.

The policing block 62 can be arranged to implement the dropping of the remainder of a packet following the dropping of one cell on an AAL5 connection.

Figure 11:
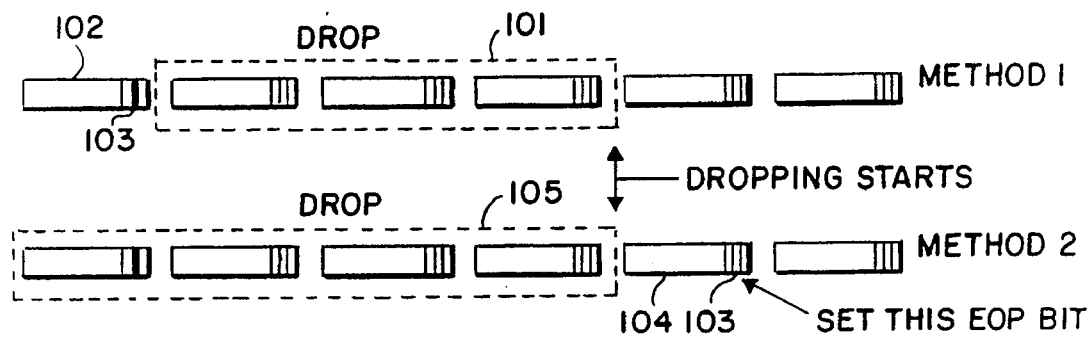
FIG. 11 is a diagram illustrating two methods for dropping an AAL5 connection cell upon a cell of the packet being dropped.

It should be noted that a cell with the EOP bit set must be sent out before the next AAL5 packet is sent, otherwise it too will be mined. There are two possible methods of doing this (see FIG. 11):

1. drop all the cells in the rest of the packet except the one 102 with the EOP bit set (that is, drop cells shown in dashed box 101 in FIG. 11);

2. drop the rest of packet (including the cell 102 with the EOP bit set), but set the EOP bit 103 on the last cell 104 before the dropping started; thus the cells shown in dashed box 105 are dropped.

Method 1 requires, if the next packet is never to be affected, an extra buffer for every AAL5 VCN, so that space for the last cell can be guaranteed. Method 2 does not require this extra buffer but does require that a mechanism is included in the Cell Queuing block 63 to change the EOP bit of an already stored cell, making the implementation more complex. Accordingly, method 1 is preferred.

The requirement of method 1 of having to reserve an extra buffer for each AAL5 connection can be dealt with by using the unreserved area of memory 31 for storing the cell with the EOP bit set, if the area reserved for the connection concerned is full when this cell arrives. This approach will only cause problems if both the unreserved area and the area reserved for the connection are full. In this case the switch must continue dropping cells on the connection so discarding the next packet.

Dropping cells according to method 1 requires that two extra flags be maintained for each VCN connection, these flags being stored in association with the master VCN of the connection. The first flag is an AAL5 flag and is set when an AAL5 connection is established. The second flag is a dropping flag and indicates that cells on this master VCN should be dropped up to the cell marked with the EOP bit set.

This criteria for dropping cells then depends on the state of the dropping flag. If the dropping flag is not set then the criteria and actions are as before except that if the cell is dropped and the AAL5 flag is set then the dropping flag is set.

If the dropping flag is set then the criteria are as follows:
if the cell does not have the EOP bit set then it is dropped, if the cell has the EOP bit set then;
    if the master VCN's current MU is less than its allocated MU the cell is not dropped, the current MU is incremented and the dropping flag is reset,
    if the master VCN's current MU is greated than or equal to the allocated MU the cell will be dropped unless the amount of space used in the unreserved region [something missing—between brackets ?] is less than some threshold. If the cell is not dropped its current MU is incremented as is the count of used space in the unreserved region. If the cell is not dropped then the dropping flag is reset.

Cell Details Queuing Block

Figure 12:
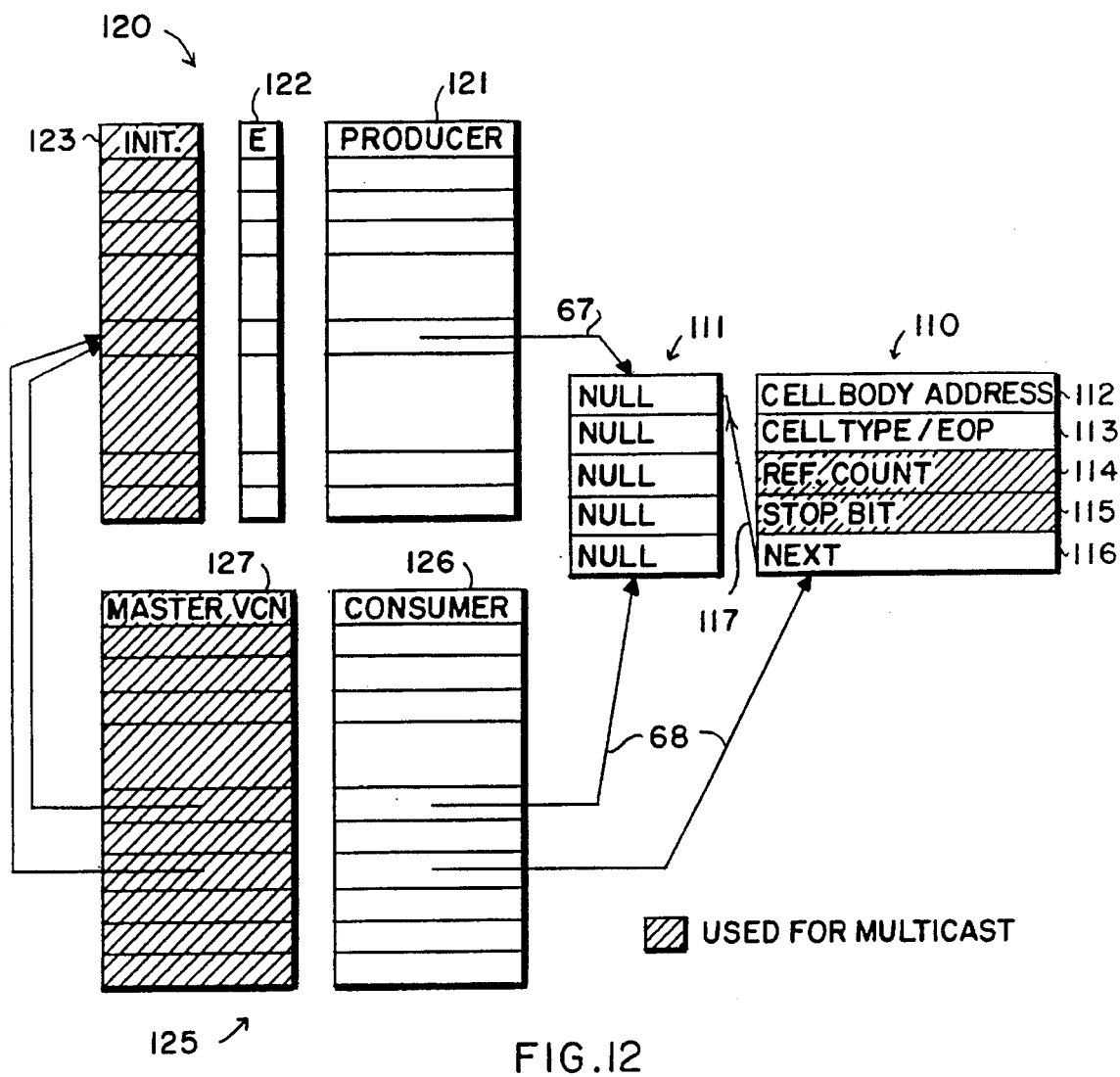
FIG. 12 is a diagram of data structures used to implement various lists and queues in a cell-details queuing block of the FIG. 8 controller.

Once a cell has passed the checks imposed by the policing block 62, the cell details (including the cell body address in memory 31) are queued as an entry on the appropriate master VCN list 65. Each list 65 is a singly listed list and each entry comprises, as well as the cell body address and header information on the corresponding cell, several fields used for maintaining the list. More particularly and with reference with FIG. 12, each list entry 110 comprises the following fields:

- a field 112 for the cell-body address;
- a field 113 for the Cell Type and EOP bit needed to reconstruct the cell's header;
- a field 114 for storing a reference count that is used for multicasts to indicate the number of times the cell still needs to be sent before it can be discarded (that is, before the memory used to store the cell body and current cell-details entry can be freed);
- a field 115 for storing the stop bit for the entry, this bit being used for multicasts as explained above; and,
- a field 116 for holding a Next entry pointer 117, pointing to the next entry in the linked list.

The next entry pointer 117 points away from the head of the list 65 (the head entry being the oldest in the list) to the next entry in the direction of the tail of the list where new cell details are added. The tail entry is always a null entry 111, that is, all its fields are set to null; the adding of new cell details involves filling the null fields of the current tail entry with the new cell details and adding a new null entry.

A data structure 120 of the input control 66 maintains for each master VCN (and, thus, for each list), the following fields:

- a field 121 for the producer pointer 67 pointing to the tail entry of the corresponding list 65;
- a field 122 holding the empty flag for the list, this flag being set when all queues 70 on the list are empty; and,
- a field 123 holding an initial reference count indicating the number of output VCNs associated with the master VCN.

The data structure 120 is accessed using the master VCN of interest.

A data structure 125 of the output control 69 maintains, for each output VCN, the following fields:

- a field 126 for the consumer pointer of the queue 70 associated with the output VCN concerned; and,
- a field 127 containing the identify of the master VCN associated with the output VCN (this enables the information on the master VCN that is held in data structure 120 to be accessed where only the output VCN is initially known).

The data structure 125 is accessed using the output VCN of interest.

The use of the above-described data structures is best understood by considering what happens when a cell arrives, and then considering what happens when a cell is sent.

Queuing a cell

When a cell arrives, the master VCN, Cell Type, EOP bit, and the cell body address for that cell are passed to the input control 66 of the queuing block and the following operations are then effected.

1. First the master VCN is used to look up the corresponding producer pointer, Empty flag and Initial reference count in data structure 120.
2. The producer pointer is then used to access the null tail entry of the appropriate list 65 and the cell body address, Cell Type, EOP bit and Initial reference count are written into the coresponding fields of the entry and the Stop bit is set to zero.
3. Once this has been done the address of a new list entry is obtained from a free list entry FIFO (not shown) and written into the Next entry field.
4. Finally, the relevant pointer is advanced by setting it to the value obtained from the free entry list.

Figure 13:
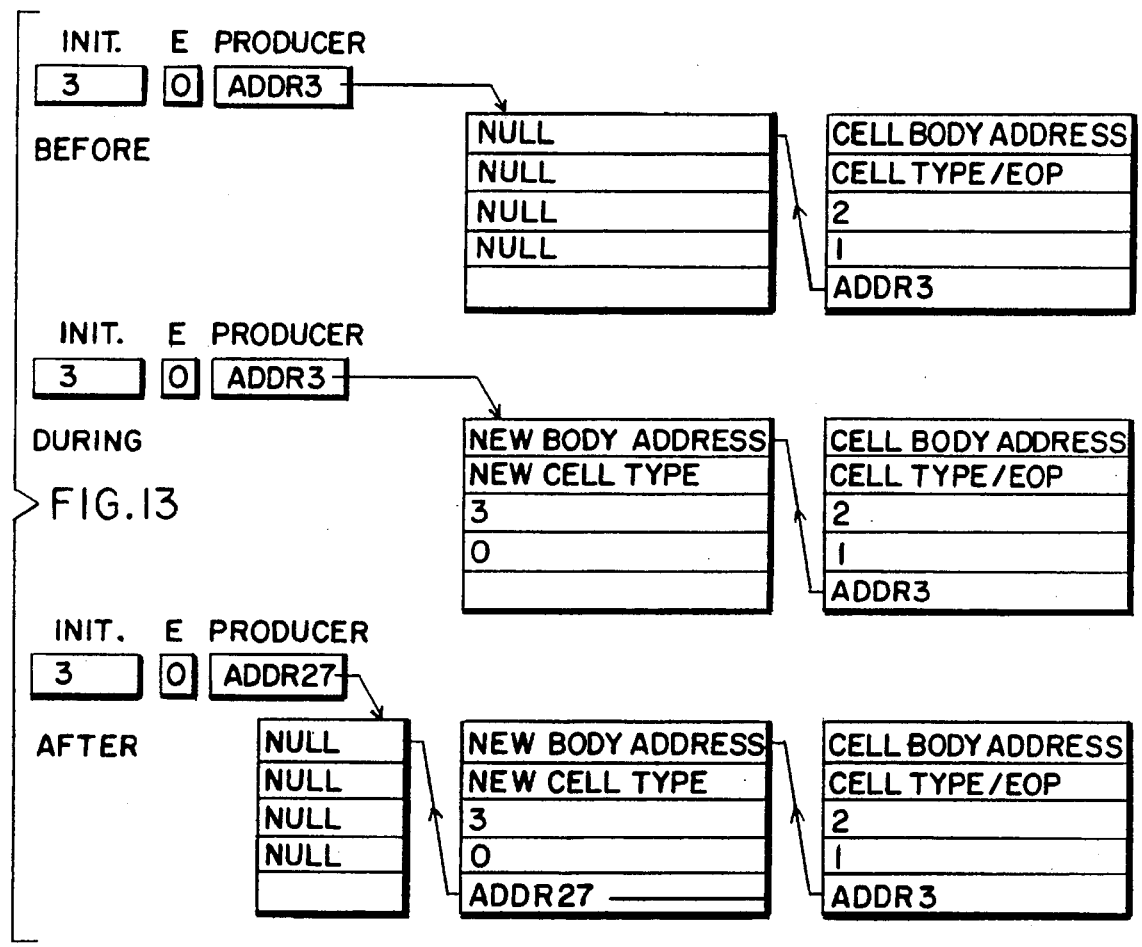
FIG. 13 is a diagram illustrating the addition to an input cell-stream list of the details of a newly arrived cell.

An example of queuing a cell-details entry is shown in FIG. 13 for a multicast case where there are three ouput VCNs associated with the master VCN concerned (i.e., the initial reference count equals 3). FIG. 13A shows the relevant list 65 before adding of the new entry commences, FIG. 13B shows the list after the new cell details have been inserted into the formerly null tail entry, and FIG. 13C shows the list after a new null tail entry has been added to complete the entry-addition process.

The important point to note from the foregoing example is that the queuing of a cell-details entry in the multicast case has been effected in the same number of operations as it would have taken for the unicast case. This is possible because a null entry is always kept at the tail of each list. Thus an empty list consists of a single null entry with the corresponding producer pointer and the or each consumer pointer pointing at it.

After queuing a cell-details entry to a list 65 that has its empty flag set the input control 66 must kick the multicast expander 83 to inform it that a cell has arrived on the master VCN concerned. As well as containing the current master VCN, the kick also includes a flag to tell the multicast expander 83 whether the master VCN is multicast. This flag is set when the initial reference count is not equal to one. By providing this flag a lookup is saved in the multicast expander (this is because in the present implementation, the first output VCN is always the same as the master VCN with which it is associated).

Once the kick has been sent, the input control 66 clears the empty flag for the list concerned. Note that this is the only time that the empty flag is cleared.

Sending a cell

Once the scheduling block 75 has decided that a cell should be sent on a particular output VCN, it tells the output control 69 of the queuing block 63. After receiving the output VCN, the output control 69 must retrieve the cell details information for the head entry in the queue 70 for the output VCN; this is readily done as the output control 69 simply uses the output VCN to obtain the consumer pointer 68 for the relevant queue and hence can immediately access the required cell details (the cell body address, cell type and EOP bit). This information is then passed on the output header generation block 64 for sending.

Once the cell details have been sent there are a number of housekeeping operations which must be performed to maintain the relevant queue 70 and linked list 65 and to inform other blocks of changes to the queue and list.

Figure 14:
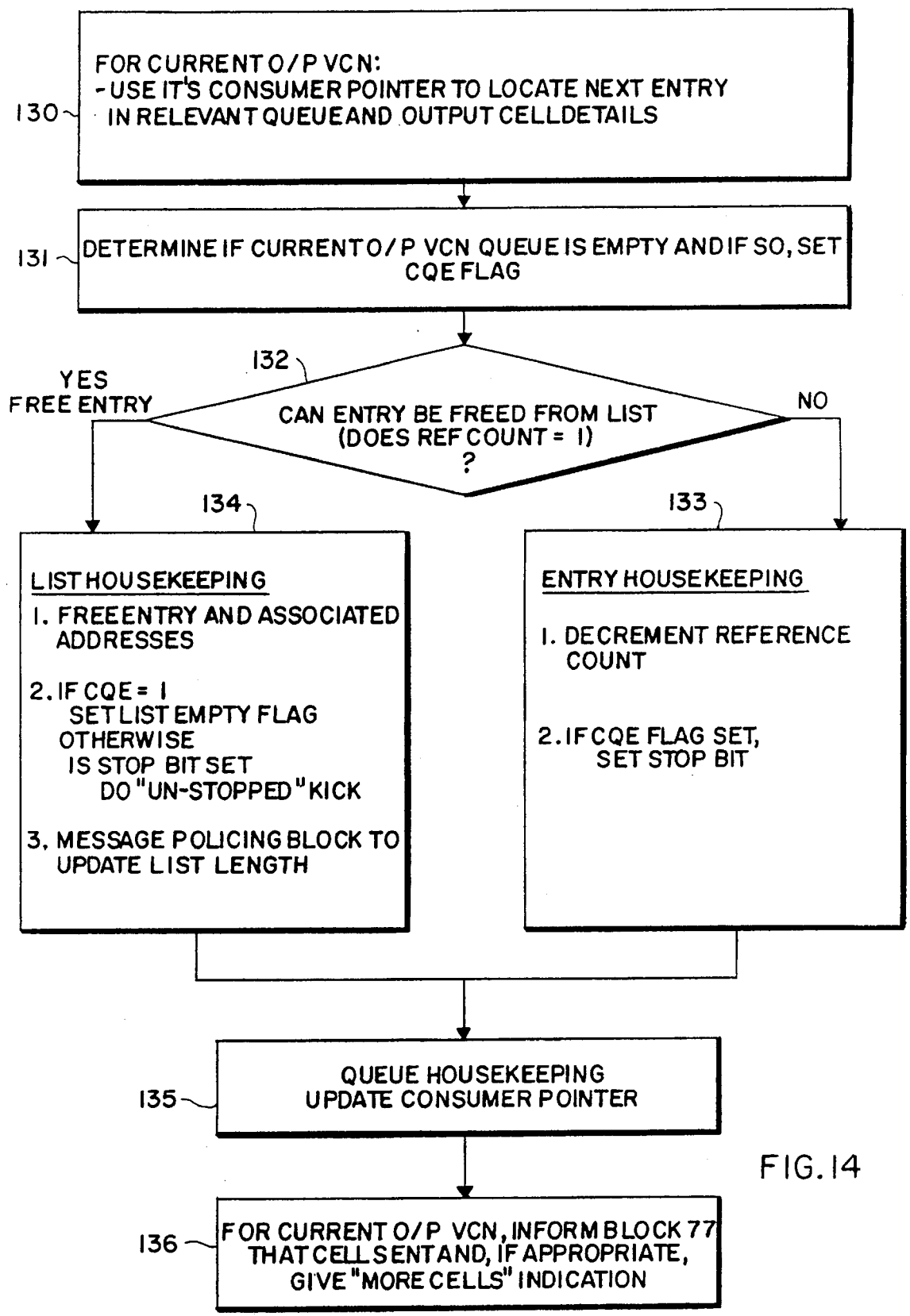
FIG. 14 is a flow-chart illustrating the operation of an output control of the queuing block of the FIG. 8 controller.

FIG. 14 is a flow chart representation of the process of outputting cell details and the resultant housekeeping required, the already described operation of outputting the cell details being shown as block 130. The use of a flow chart should not be taken as implying that the operations concerned are performed in software; in fact, for reasons of speed of execution, a hardware implementation will generally be required.

The housekeeping operations required following the outputting of cell details are:

(i) to work out if the relevant queue 70 is empty (block 131);

(ii) to work out if the cell details entry just output should be freed (block 132);

(iii) if the entry is to be retained, to carry out entry related housekeeping (entry housekeeping block 133);

(iv) if the entry is to be freed, to free the entry and carry out list related housekeeping (list housekeeping block 134);

(v) to move the consumer pointer (queue housekeeping block 135); and, (vi) to work out whether the output VCN should continue to be considered for scheduling (block 136).

These operations are described below.

(i) Queue empty (block 131)?

To work out if the relevant queue 70 is empty, the Next pointer of the queue entry just output is compared to the producer pointer for the list 65 onto which the queue is mapped. If the Next pointer and producer pointer match, then there are no more entries in the queue waiting to be output—in other words, the queue is empty. In order to look up the relevant producer pointer, the output control 69 must first identify the master VCN corresponding to the current output VCN, and this is done by referring to field 127 of data structure 125 (see FIG. 12). The output control then uses the master VCN to access the data structure 120 and retrieve the required producer pointer. For the unicast case, if the sole output VCN has been made the same as the master VCN, then of course the data structure 120 can be accessed directly using the output VCN to look up the producer pointer. If after comparing the next pointer and producer pointer, the queue 70 is found to be empty, a temporary flag CQE (Current Queue Empty) is set by the output control 69, this flag being internal to the output control.

(ii) Can entry be freed (block 132)?

An entry can only be freed from the list 65 on which it is queued when it has been output for all the output VCNs having queues 70 mapped onto the list 65. The reference count field 114 is used to keep track of how many more times an entry must be output (as already described, the reference count is initially set by the input control 66 to a value corresponding to the total number of queues mapped onto the list). To decide whether an entry can be freed, the output control 69 has only to check the reference count field 114—if it has a value of one, the entry can be freed (the value of one being for the outputting of the entry that has just occurred in block 130).

(iii) Entry Housekeeping (block 133)

If an entry is not yet to be freed, the reference count held in field 114 is decremented to track the number of output VCs for which the entry has yet to be output. Furthermore, if the current queue is now empty (as indicated by the CQE flag, potentially set in block 131), then the stop flag of the entry is set, ensuring all queues 70 in a multicast case are brought back into step as previously explained. An example of use of the stop bit is given hereinafter.

(iv) List Housekeeping (Block 134)

If a list entry is to be freed, then this is done by placing the entry address on the free address list maintained for list entries. In addition, the cell body address is placed on the free address list 32 (FIG. 4). Next, the output control 69 tests the CQE flag and if this flag is set (indicating that the current queue is empty), the output control knows that the corresponding list is also empty; in this case, the output control causes the correspondig empty flag 122 in data structure 120 to be set. If the CQE flag is not set, indicating that there are more entries to send, but the stop bit of the entry just output was set, then the output control 69 knows that all queues of a multicast case have now been brought into step so that the corresponding output VCNs can be re-injected into the send control path; to do this, the output control 69 sends an "un-stopped" kick to the VCN send kickoff block 82. Finally, the output control messages the policing block 62 to inform it of the new list length after removal of the entry just output.

(v) Queue Housekeeping (block 135)

The only housekeeping required for the current queue (the queue from which cell details information was output in block 130) is the updating of the consumer pointer 68 to point to the next entry in the queue; to do this, the output control 69 simply sets the consumer pointer to the Next pointer value held in the entry just output.

(vi) Should the Output VCN be Recycled (block 136)?

The output control 69 passes the eligibility control block 77 the current output VCN to enable the latter to decrement the corresponding credit count. At the same time, the output control 69 considers whether the output VCN upon which it has just acted can be recycled back to the send control path. The output VCN is only recycled if there are more entries in the corresponding queue 70 (that is, the CQE flag is not set) and, for multicasts, the entry just sent does not have its stop bit set to indicate that multicast queues are being aligned at the entry. The output control 69 tests for this combination of circumstances and, if present, sends a "more cells" indication to the eligibility control block along with the output VCN.

Having described the general functioning of the lists 65 and queues 70 as well as the detailed steps taken by the input and output controls 66, 69 to implement this functioning, an example will now be given to assist a full understanding, particularly as regards the functioning of the stop bit in regulating the output of entries from multicalt queues mapped onto the same list 65.

Figure 15:
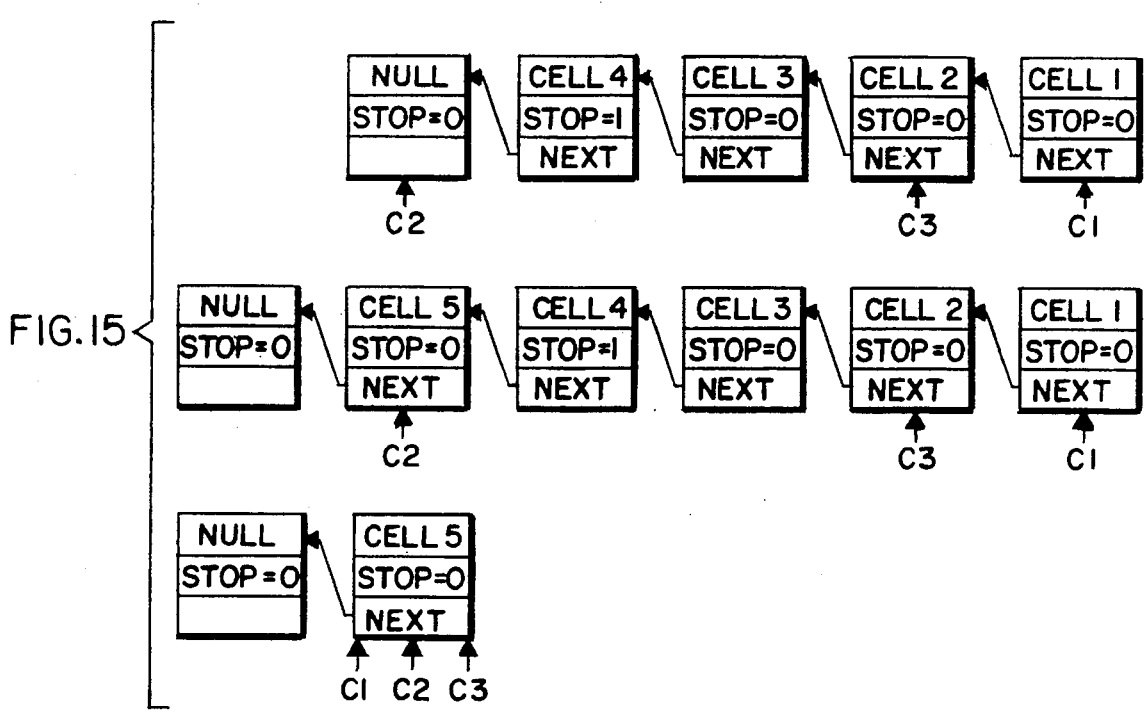
FIG. 15 is a diagram illustrating the purpose and effect of the stop bit included in each cell-details entry of the lists and queues maintained in the queuing block.

FIG. 15A illustrates a list 65 having five entries made up of entries for cells Cell1, Cell2, Cell3, Cell4 and a null entry at the tail of the list; for clarity, only the stop bit field and Next entry pointer field have been individually shown for each entry, the other fields being represented by the label Cell1, Cell2, Cell3, Cell4 and Null as appropriate. Three queues 70 are mapped into the list by means of respective consumer pointers C1, C2 and C3 that point to the head of each queue, the tail of each queue being the null entry. Thus, the queue (the first queue) associated with pointer C1 that points to entry Cell1, has four entries waiting to be sent (Cell1 to Cell4); the queue (the seond queue) associated with pointer C2 that points to the Null entry has nos entries waiting to be sent; and the queue (the third queue) associated with pointer C3 that points to entry Cell2, has three entries waiting to be sent (Cell2, Cell3, Cell4).

At the time that the second queue became empty, the output control 69, in carrying out the entry housekeeping of block 133 of FIG. 14, set the stop bit of the entry just output (the entry Cell4), this being indicated by "STOP=1" in FIG. 15A. The output VCN associated with the second queue was not recycled by the output control.

FIG. 15B shows the addition of a new entry Cell5 to the list of FIG. 15A, the entry details being entered into the previous Null entry at the tail of the list and a new Null entry being appended to the list. The consumer pointers C1, C2, C3 point at the same entries as before.

Even though there is now a new entry in the second queue, it will not be sent as the corresponding output VCN is not currently in the send control path and is therefore not available for scheduling. However, the output VCNs for the first and third queues are still in the send control path and are being scheduled; each of these queues will therefore be progressively reduced in length. As a list entry is output for the third time (this may be in respect of the first or third queue) the entry is freed. In due course, the entry Cell4 will be output from one of the first and third queues and at this time the output VCN associated with the queue is not recycled because the stop bit of the Cell4 entry is set; the corresponding consumer pointer thus comes to rest on the entry Cell5 along with pointer C2. Eventually, the Cell4 entry is output by the last of the three queues and the corresponding consumer pointer set to point to entry Cell5. the entry Cell4 is freed and the output control 69 recognises that it needs to kick the kickoff block 82 to reinject the output VCNs of all three queues into the send control path to restart the outputting of entries from these queues.

Send Kickoff Block

The output VCN send Kickoff block 82 takes a "kick" on a particular master VCN and expands it into all the associated output VCNs. In the present embodiment, the first output VCN is made the same value as the master VCN so that for the unicast case, the master VCN can be directly taken as the output VCN. The output VCNs provided by the expansion operation are passed on from the block 82 to the eligibility control bock 77 when the latter asks for them.

As already described, Kicks may originate from the input control 66 upon a list 65 passing from an empty to a non-empty state ("non-empty" Kicks) or from the output control 69 upon all queues 70 on a list aligning at an entry following one whose stop bit was set ("un-stopped" Kick). Kicks from the latter source will always be associated with multicast cases whereas Kicks from the input control 66 may relate to unicasts or multicasts. The input control 66 will know from the data stored in field 123 of data structure 120 (see FIG. 12) whether a master VCN relates to a unicast or multicast and passes this information along with the master VCN when effecting a "non-empty" Kick on the send Kickoff block 82.

Thus, the block 82, on receiving a Kick, will know both the master VCN concerned and whether it relates to a unicast or multicast connection.

As noted above, the send Kickoff block includes buffering placed upstream of any per output VCN operation. One way of doing this it to implement the multicast expander 83 as a Kick FIFO 140 (see FIG. 16) for storing each Kick received, and a multicast group store 14 1 storing for each multicast connection the group of related output VCNs. The general operation of block 82 is then as follows. When a Kick is entered in the Kick FIFO 140 to record the master VCN concerned, an associated multicast flag is appropriately set to indicate whether or not the Kick relates to a multicast connection. The stored Kicks are then processed in FIFO order by the block 82, output circuit 84 outputting when requested by the eligibility control block 77, the or each output VCN associated with the master VCN of a Kick. In particular, if a Kick relates to a unicast master VCN, then the output circuit 84 simply outputs the master VCN as the corresponding output VCN; however, if the multicast flag of a Kick is set to indicate that it relates to a multicast master VCN, then the output circuit 84 uses the master VCN to index into the multicast group store 41 and output in turn each associated output VCN.

By making the Kick FIFO large enough to hold a Kick for every master VCN (there will only ever be one current Kick per master VCN), the above arrangement ensures that no Kicks are ever lost whilst providing the desired processing elasticity to deal with multicast expansion.

The detailed working of the FIG. 16 arrangement is as follows. The procedure for adding an entry (Kick) to the FIFO 140 depends on whether the FIFO is currently empty or not. This is indicated by an associated empty flag 142. If the empty flag is set, the FIFO is empty and adding a new entry involves writing the new master VCN in the Kick to Read and Write pointers 143, 144, appropriately setting the multicast flag 145 in the entry pointed to by the Write pointer (in the present example, a value of one indicates a multicast connection), and resetting the empty flag 142.

If the empty flag is not set, the FIFO 140 is not empty and adding a new entry involves two steps. First, the new master VCN is written to the location that the Write pointer currently points at. Second, the new master VCN is written to the Write Pointer and the multicast flag at the new location pointed to by the Write pointer is appropriately set. In the example shown in FIG. 16 adding master VCN 11 to FIFO 140 would involve writting 11 to location 14 and then writing 11 to the Write pointer and setting the multicast flag in location 11 appropriately.

Reading the FIFO 140 will return the value in the Read pointer 143 together with the state of the multicast flag held in the location pointed to by the Read pointer. The Read pointer is then advanced by reading the location to which it points and storing the read value as the new value of the Read pointer. However, before this new value is written to the read pointer, the old entry must be changed to be NULL. Once this is done, the new value can be written to the read Pointer.

The FIFO 140 is empty when the value written to the read Pointer is NULL; in this case, the empty flag is set.

Figure 16:
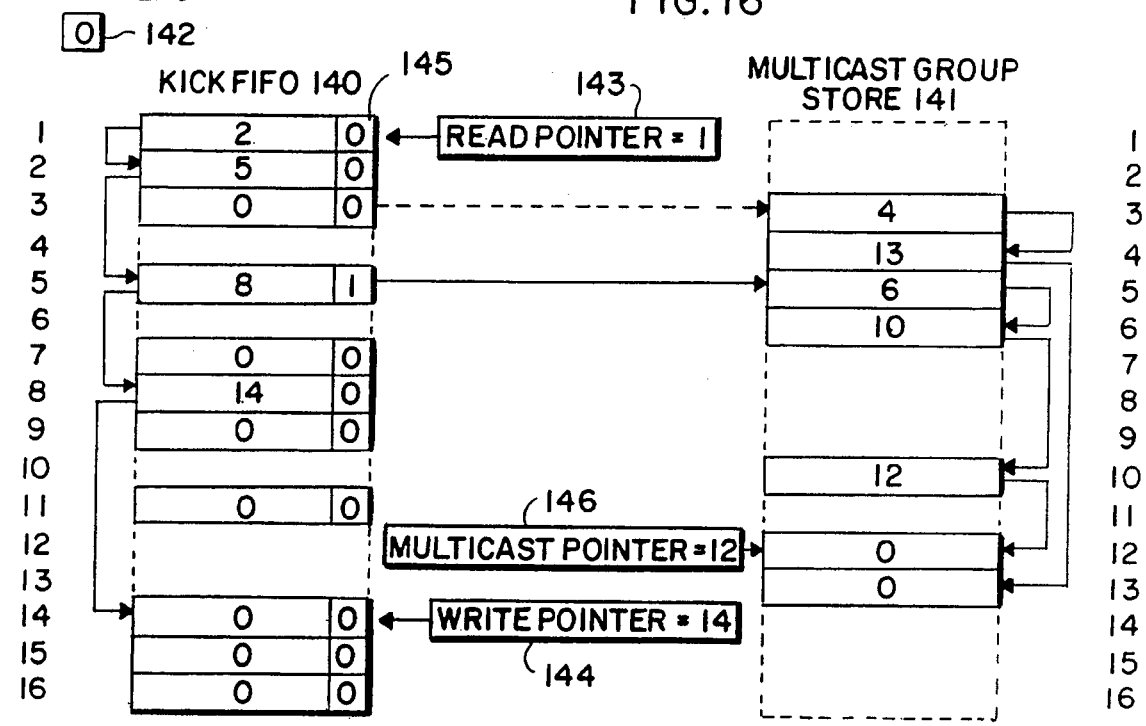
FIG. 16 is a diagram of data structures for implementing a multicast expander of the FIG. 8 controller.

A read from the FIFO 140 shown in FIG. 16 would return a master VCN value of 1 with an indication that it related to a unicast connection. Advancing the Read pointer would involve reading location 1 (giving a value of 2), writing 0 to location 1 and finally writing 2 to the read pointer.

Where a master VCN read from the FIFO relates to a unicast connection, the master VCN is simply output as the output VCN. However, where the master VCN relates to a multicast connection, then the multicast group store 141 must be referred to for the output VCNs to be output.

Multicast groups are held as singly linked lists in store 141. These lists are created when a multicast connection is set up. Expanding a Kick on a particular multicast master VCN simply involves initially using the master VCN to enter the correct list in store 141 and then following the list using a Multicast pointer 146 and copying each output VCN encountered.

The example entries of FIG. 16 show the following:

Multicasts group set up: 3, 4, 13 5, 6, 10, 12

Input sequence of master VCNs: 1, 2, 5, 8, 14

Output sequence of output VCNs: 1, 2, 5, 6, 10, 12, 8, 14.

Figure 17:
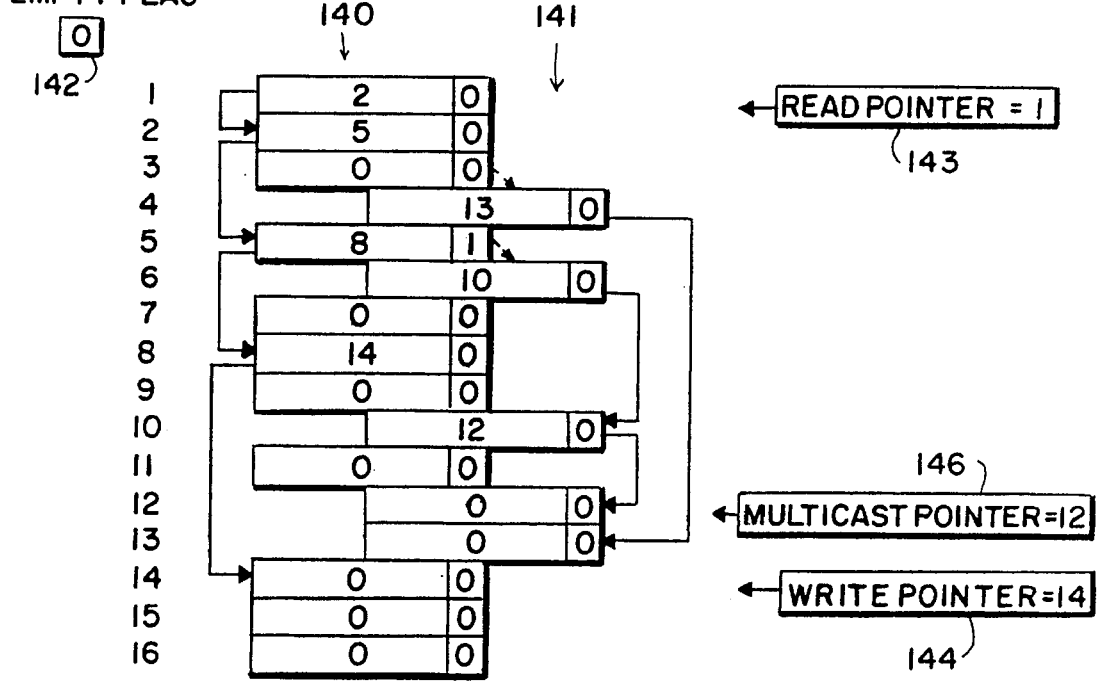
FIG. 17 is a diagram illustrating an improved implementation of the FIG. 16 data structures.

FIG. 17 shows a refinement of the FIG. 16 arrangement. Because the or the first output VCN associated with a master VCN has the same value as the latter, the output VCNs in a multicast group, other than the first output VCN, will have been chosen with values different from any master VCN. As a result, it becomes possible to arrange for the Kick FIFO 140 and multicast group store 141 to use the same block of memory, the first entry in each multicast group list being discarded as redundant over the corresponding master VCN entry. FIG. 17 graphically depicts this effective merging of the FIFO 140 and store 141. Now when a multicast master VCN is read from the Kick FIFO, its value is output as the first output VCN of the corresponding multicast group and the other output VCNs are then output using the appropriate linked list. In fact, to locate this list, some appropriate connection must be provided; in the present example, this connection is made implicit simply by arranging that the second output VCN in every multicast group always has a value of one more than the first output VCN (that is, than the master VCN). The connection could be made explicit (and variable) by including an extra pointer associated with each master VCN but this is not preferred.

In FIG. 17, it will be noticed that even the entries belonging to the multicast group store have been shown as having a multicast flag field. This is simply because it is convenient to have all entries, whether belonging to the FIFO data structure 140 or store data structure 141, of the same size.

It may be noted that the combined structures 140 and 141 of FIG. 17 can be considered as an output VCN FIFO store alone, because upon each Kick being entered it effectively sets up the connections adding the appropriate output VCNs to the sequence of those awaiting output. Buffering the output VCNs rather than the Kicks is possible because no per output VCN operations are required for making entries to the FIG. 17 arrangement—the only per output VCN operations are those involved in extracting the output VCNs from the FIG. 17 arrangement.

Credit Provision

The credit provision block 80 (FIG. 8) provides send credits to the eligibility control block 77 in respect of output VCs that are either:

(a) Best Effort, flow controlled; or, (b) Guaranteed Bandwidth.

For case (a), the send credit reflects the amount of available buffer space advertised by the downstream node; it is the responsibility of the flow control block 85 to interpret the credit messages received from the downstream node and to inform the credit provision block 80 of the credit amounts advertised for the output VCNs concerned.

For case (b) (Guaranteed Bandwidth VCs), the credit provision block 80 operates a token bucket rota for generating tokens (credit) at regular intervals, the average rate at which tokens are generated in respect of a particular Guaranteed Bandwidth VC being set to reflect the rate at which the VC is allowed to send. the generated credits are passed to the eligibility control block 77 where they are placed in token buckets associated with the appropriate output VCNs. When a cell in sent in respect of an output VCN, a credit is removed from the corresponding token bucket.

Figure 18:
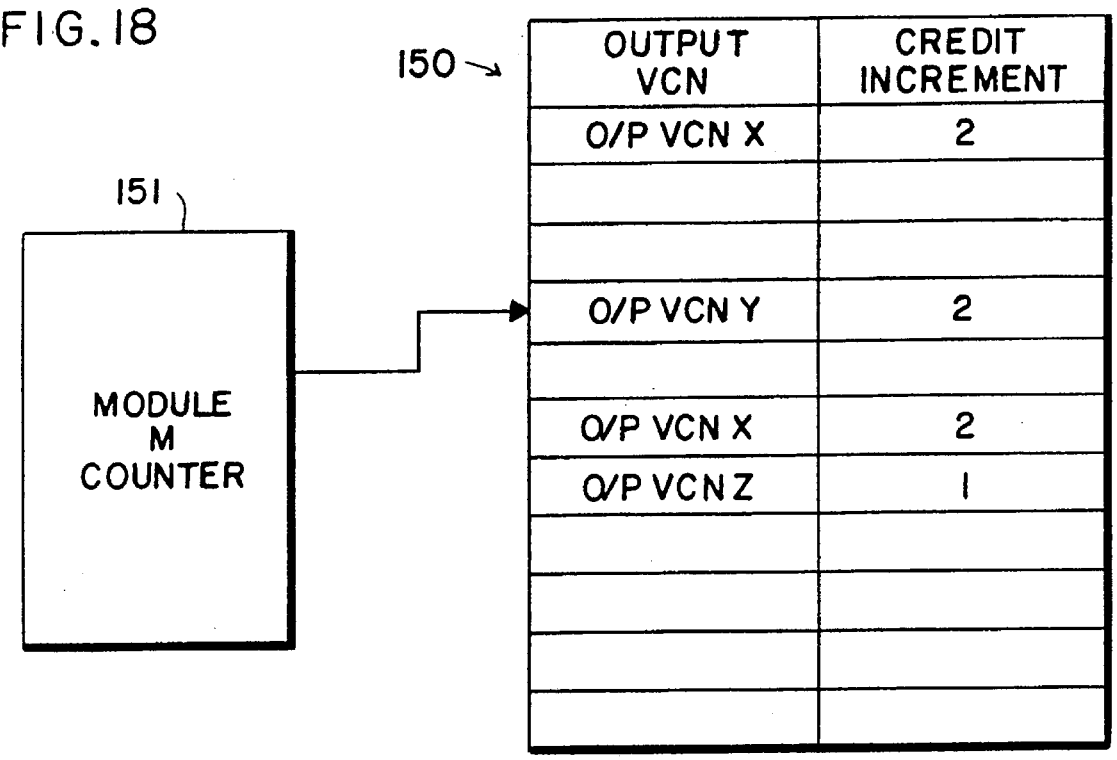
FIG. 18 illustrates a credit bucket rota table maintained for guaranteed bandwidth services.

The token bucket rota operated by the credit provision block uses a table 150 and a counter 151 as shown in FIG. 18.

The table 150 is of fixed size (M entries) and contains the output VCNs which relate to Guaranteed Bandwidth VCs. Associated with each output VCN is a credit increment value.

The counter 151 is a modulo M counter which is incremented at regular intervals. After the counter has been incremented, the output VCN and credit increment is read out of the table and sent to the eligibility control block. If the table entry is blank then no credit is sent during this interval.

The reason for having the credit increment field rather than always sending a single credit is to avoid the need for the eligibility control block to have to service the token bucket rota every cell time. If, for example, the token bucket rota is serviced only every other cell time, then if only one credit could be sent at each service, the switch would be unable to allocate more than half of its output bandwidth to Guaranteed Bandwidth VCNs. Conversely, if this problem were avoided by always sending two credits, the accuracy of the token buckets would be affected.

Generally, the credit increment field will be one bit wide so as to be able to indicate whether one or two credits should be sent. The field could be made wide to allow for greater flexibility.

The length of the table in the token bucket rota is determined by the resolution required in allocating bandwidth. Typically, each table entry can be arranged to correspond to a 64 Kb/s slice of bandwidth.

The token bucket rota is set up at connection establishment time. If one 64 Kb/s slice is required for a particular output VCN, the processor unit must find an empty table entry and write the VCN to it. If more slices are required, the processor unit must write the output VCN into the rota several times spaced as evenly as possible.

Eligibility Control Block

The function of the eligibility control block 77 is to keep track of the send credit of output VCNs that need credit to send, and to pass on to the scheduling block 75 those output VCNs with cells to send that either require and have send credit, or do not require such credit.

The eligibility control block 77 maintain a certain amount of data for each output VCN, this data being held in table 81 and comprising the following items (see FIG. 19):

credit, which is the number of cells which the output VCN currently has credit to send;

maximum credit, which is the maximum value that the credit field may take;

the "cells flag", which when set indicates that the output VCN has cells in its queue but was not scheduled because of lack of credit;

the QOS (quality of service) associated with the output VCNs; this will be one of:

GB0—Guaranteed Bandwidth with low latency,

GB1—Guaranteed Bandwidth with ligher latency,

BE—Best effort;

the "output control flag", which when set indicates that a Guaranteed Bandwidth output VCN has a shaped output, or that a Best Effort output VCN is flow controlled; and, the external port number.

All of this data, except the credit and "cells flag" is set up at connection establishment time and not changed after this.

Figure 19:
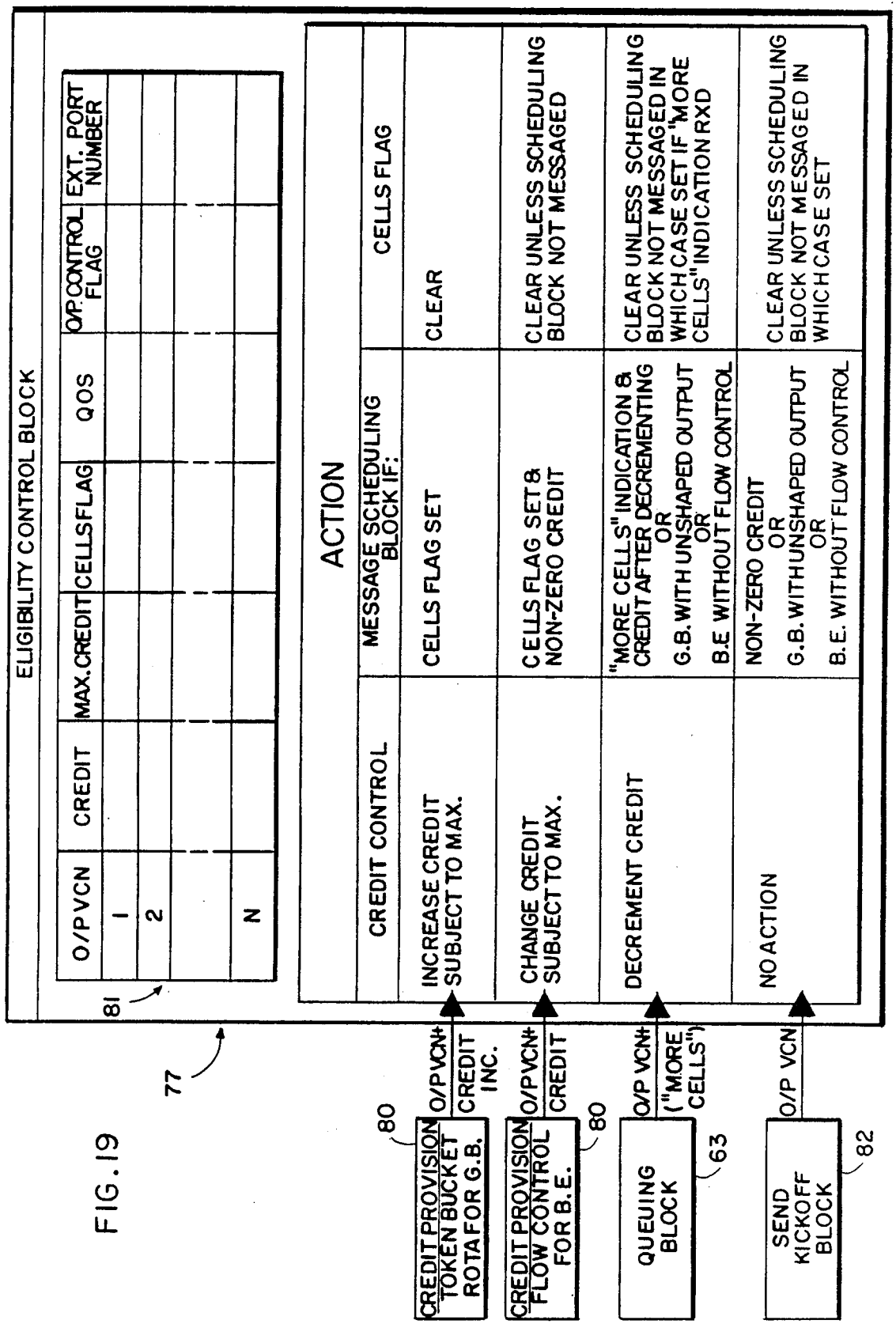
FIG. 19 is a diagram illustrating the operation of an eligibility control block of the FIG. 8 controller.

As shown in FIG. 19, the eligibility control block is arranged to receive input message from four different sources. Each input message comprises an output VCN and certain information pertaining to that output VCN. These inputs and their effect on the send credit of an output VCN are as follows:

1. An output VCN from the send kickoff block 82 signalling that at least one new cell is available for that output VCN. This input has no effect on the corresponding credit count;
2. An output VCN and credit increment from the token bucket rota of the credit provision block 80 signalling that the output VCN's token bucket should have more credit placed in it. The credit count is increased accordingly subject to the maximum credit limit;
3. An output VCN and credit amount from the flow control block (via the credit provision block 80) signifying that a downstream node has advertised this amount of credit. The corresponding credit count is set accordingly; and,
4. An output VCN, possibly with a "more cells" indication, from the queuing block 63. The receipt of the output VCN indicates that a cell has been sent on that output VCN so that the latter's credit must be decremented (unless it is zero). The "more cells" indication indicates that the VCN's queue has more cells and so should continue to be considered for scheduling, provided it still has credit.

After the eligibility control block 77 has made any required adjustment to the credit count of an output VCN on which it has just received an input, it goes on to consider whether, in view of that input, a message should be sent to the scheduling block placing the output VCN in the appropriate queue. A message will be sent to the scheduling block in the following circumstances:

1. An output VCN from the send Kickoff block will cause a message to be sent:
   if the credit is greater than zero,
   or if the VCN is Guaranteed Bandwidth with an unshaped output,
   or if the VCN is Best Effort without flow control;
2. An output VCN and credit increment from the token bucket rota will cause a message to be sent if the "cells flag" is set indicating that the VCN has cells but has not previously been scheduled due to lack of credit;
3. An output VCN and credit from the output flow control block will cause a message to be sent if the credit is now non-zero and the "cells flag" is set; and
4. An output VCN and "more cells" indication from the queuing block will cause a message to be sent:
   if the credit after decrementing is greater than zero,
   or if the output VCN is Guaranteed Bandwidth with an unshaped output,
   or if the output VCN is Best Effort without flow control.

The message sent to the scheduling block contains the relevant external port number and queue number, as well as the output VCN. Obtaining the external port number just involves looking it up in table 81. The queue number normally corresponds to the QOS of the VCN. So GB0 output VCNs go in queue 0, GB1 output VCNs go in queue 1 and Best Effort output VCNs go in queue 2. There is one exception to this rule: Guaranteed Bandwidth output VCNs which have unshaped outputs and have no credit are put in queue 2 (the Best Effort queue).

The final task which the eligibility control block must perform is to update the "cells flag". The "cells flag" indicates that an output VCN has cells queued but was not passed to the scheduling block because it did not have credit. There are two ways in which this can arise:

when an output VCN arrives from the send kickoff block and the output VCN is not passed on to the scheduling block because it has no credit; and, when an output VCN arrives from the queuing block with the "more cells" indication and is not passed on to the scheduling block because is has no credit;

The "cells flag" is set in these two cases. In all other cases, the "cells flag" is cleared except in the situation of an output VCN arriving from the flow control block and the output VCN not being passed on to the scheduling block because it has no credit; in this situation, the cells flag is not changed.

One further point to note about the eligibility control block is the frequency at which it receives messages from each input. If the block can handle all four inputs in a cell time, then there is no issue. However, typically, this will not be the case and, for example, it may only be possible to handle two inputs per cell time. the following considerations then come into play in determining which inputs need to be serviced in each cell time:

the input from the queuing block 63 must be dealt with every cell time because it is able to send cell details every cell time;

the token bucket rota can be designed to provide an output less than every cycle because the increment size can be specified;

the flow control inputs will not be frequent compared to the cell time and can be controlled by means of a "ready" signal going from the eligibility control block to the flow control block: and, the send kickoff block will be providing kicks at a lower rate than one per cell time, and even if kicks are arriving one per cell time there is the kick FIFO to ensure that no information is lost. Thus, this input can also be controlled by means of a "ready" signal and need not be read every cell time.

Figure 20:
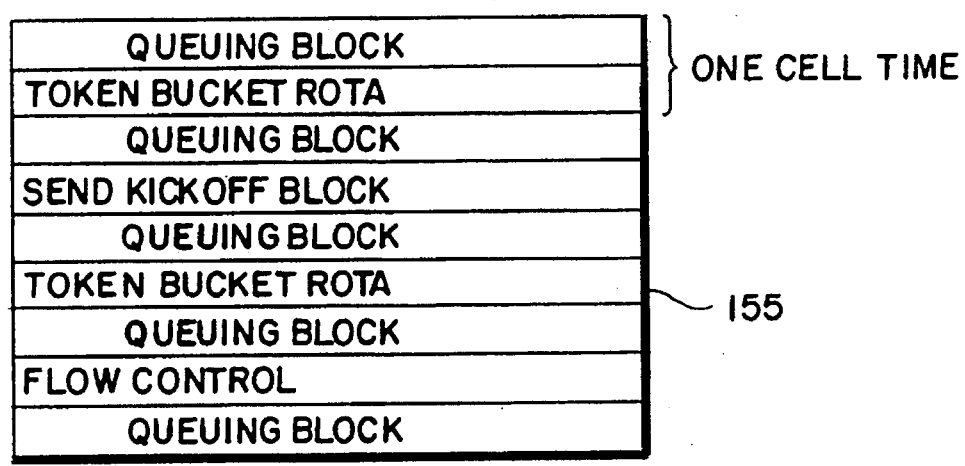
FIG. 20 show a service rota operated by the eligibility control block.

In view of these considerations, where only two inputs can be handled each cell time, the rota 155 shown in FIG. 20 is used in which the queuing block inputs are serviced every cell time, the token bucket rota inputs every other cell time, and the remaining inputs every fourth cell time.

Scheduling block

As already described, the task of the scheduling block 75 is to select the next output VCN to send on and pass this output VCN to the output control 69 of the queuing block 63.

A respective queuing structure 76 is maintained in the scheduling block for each external port, each structure comprising three FIFO queues, one for each priority (GB0, GB1, and BE) as illustrated in FIG. 9. The scheduling block on receiving a message from the eligibility control block, places the output VCN contained in the message in the appropriate queue as indicated by the other information in the message.

The scheduler 78 examines the queuing structure 76 in accordance with the external port rota 60B. Once the scheduler 78 has obtained the next external port number from the rota, it looks for the highest priority, non-empty queue in the queuing structure for that port and reads out the first output VCN from it.

The external output-port rota 60B in the scheduling block 75 is essentially the same as the rota 60A associated with the master VCN lookup block 61 (assuming that the external input and output ports are paired). However, the output port rota 60B uses inputs from the monitor units 44 of the adapter cards to take account of when the output FIFO 42 has exceeded its one-cell threshold. In particular, the rota 60B prevents scheduling on an external output port whose FIFO has exceeded its threshold by outputting a NULL port number in the corresponding scheduler time slot until the FIFO empties to below the threshold.

The data structures which implement the FIFO queues in the scheduling block are similar to those used in the multicast expander 83. These efficient structures can be used because it is guaranteed that output VCNs can only make one appearance at any one time in a scheduling-block queue. Indeed, an output VCN will only be in at most one queue. As a result, it is possible to overlay all of the FIFO queues in one small block of memory while still being sure that none of the FIFO queues will ever become full.

Figure 21:
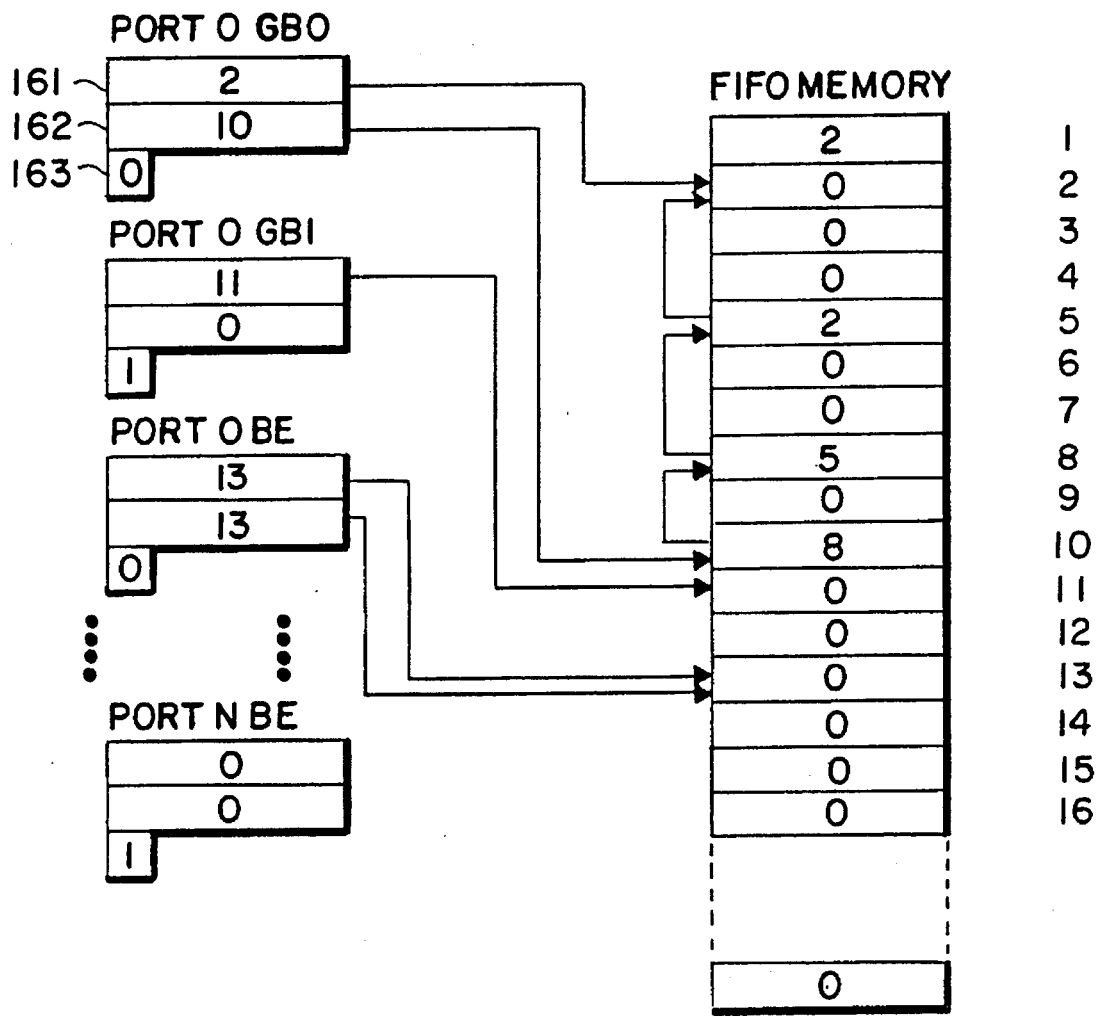
FIG. 21 is a diagram of data structures used in a scheduling block of the FIG. 8 controller.

The data structures used to implement the scheduling FIFO queues are shown in FIG. 21 together with sample data for the queues relating to external port 0. Also shown in a dashed box in this Figure, is a more conventional FIFO representation of the example data.

Each FIFO queue (for example, queue Port 0, GB0) is stored as a singly linked list with a head pointer 161, a tail pointer 162, and an empty flag 163. These pointers reference a block of memory big enough to hold all the possible output VCNs. Data is read from and written to each FIFO queue in the same way as the kick FIFO described above.

After each read from a FIFO queue, the tail pointer 162 is tested to see whether the FIFO queue has gone empty. If the tail pointer is NULL, then the FIFO is empty and the empty flag 163 is set. The flag will remain set until a write occurs to that FIFO queue.

In FIG. 21, each empty flag is shown grouped with the corresponding head and tail pointers. However, in practice, the empty flag 163 of all queues associated with same external port will be grouped together so that they can be read in one operation; this then makes it easy for the scheduler 78 to determine which queue should be read for the current external port in rota 60B.

Output Header Generation Block

After the scheduler 78 has taken an output VCN from a port queue, it passes this output VCN to the output control 69 of the cell-details queuing block 63 which retrieves the cell-details for the next-to-be-sent cell on that output VCN. These cell details and the output VCN are passed to the output header generation block 64 whose task it is to generate the header for the cell to be sent. The first step in generating a header is to use the output VCN to look up the output VPI and VCI in a table 165 which stores this information. This table 165 is set up at connection establishment.

The VPI and VCI are then combined with the cell type and AAL5 EOP bit from the cell-details information passed to block 64 to form the first four bytes of the cell header. These are then passed to the fabric 30 along with the address of the cell body.

It should be noted that the header error check is not calculated at this point. Instead, this calculation is done in the relevant adapter card.

Variants

It will be appreciated that the above-described functional blocks can be implemented in a variety of ways though generally hardware implementations will be preferred for speed of processing.

Figure 22:
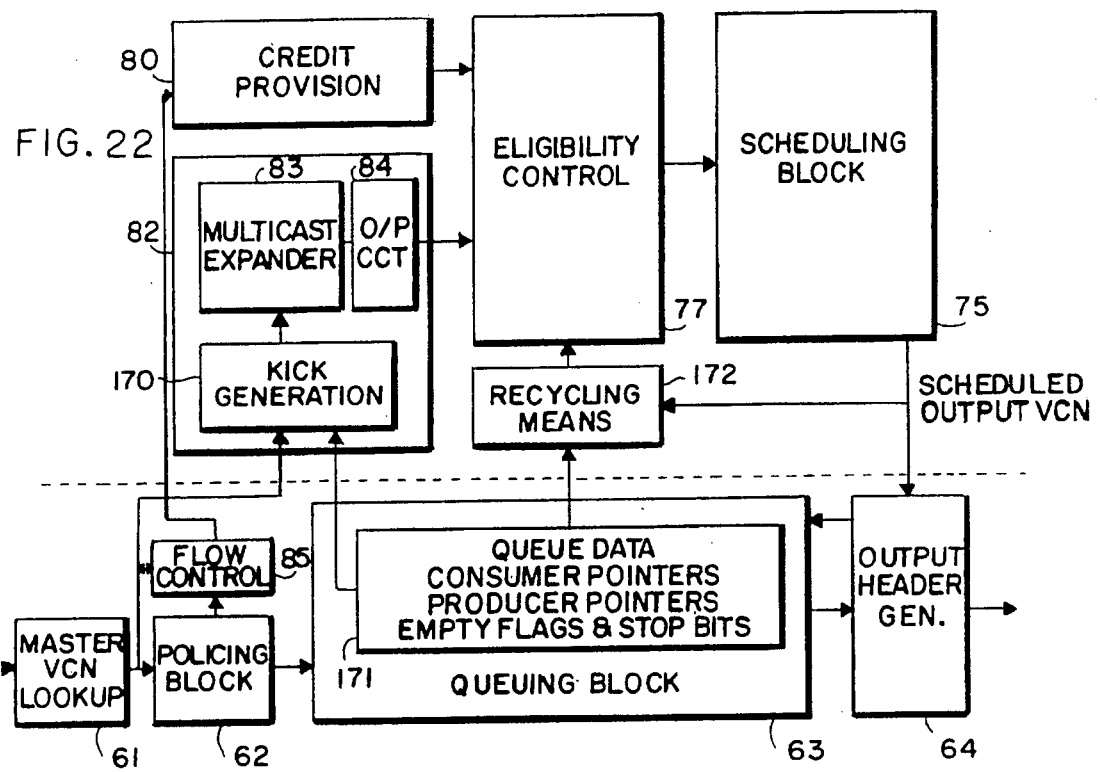
FIG. 22 is a functional block diagram of the FIG. 8 controller but with the functional block boundaries changes as compared with FIG. 8.

It will further be appreciated that the described functionality may be divided between blocks in various ways and generally the boundaries of these blocks are arbitrary. Thus, for example, and with reference to FIG. 22, the functionality used to generate the "Kicks" supplied to the multicast expander 83 can be considered to reside in the send control path rather than in the queuing block. In particular, this Kick-generating functionality could be considered pan of the send Kickoff block 82 (see Kick generation block 170 in FIG. 22). This Kick generation block effectively receives all master VCNs of incoming cells but only generates a kick upon the queue data 171 held in queue block 63 (that is, the producer and consumer pointers, the empty flags and stop bits) indicating that the appropriate conditions (already detaild) are present. Similarly, the mechanism for recycling output VCNs can be considered as queue-data responsive functionality contained in the send control path. rather than being embedded in the queuing block 63 (see recycling block 172 in FIG. 22). Again, the output VCNs output by the scheduler 78 may be viewed as being fed to a cell output mechanism, including the block 165, that then uses the queuing block 63 to provide the cell body address. Numerous other variations in functional block boundaries can be envisioned without fundamentally altering the principles of operation of the described switch.

Figure 23:
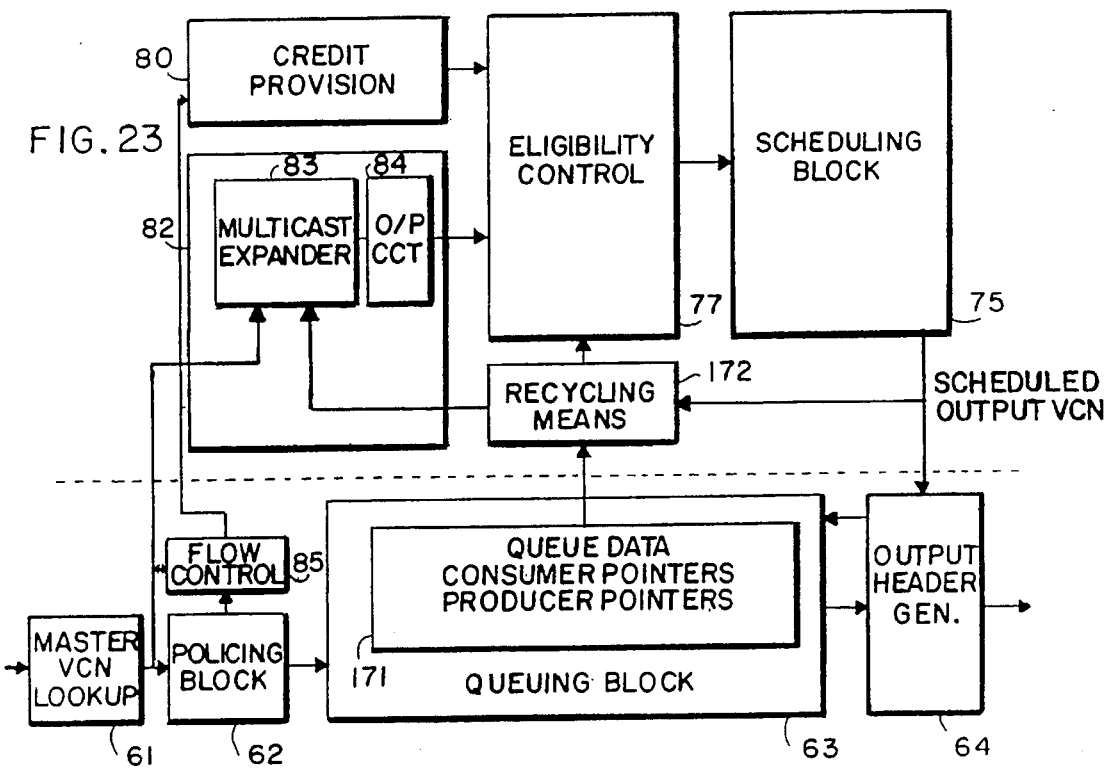
FIG. 23 is a functional block diagram similar to FIG. 22 but showing a variant of the controller.

More substantive variations are also possible. In particular, the mechanism for injecting output VCNs into the eligibility control block from the send Kickoff 82 can be varied as will now be explained with reference to FIG. 23, this Figure being generally drawn with the same functional block boundaries as in FIG. 22. The general principle behind the output-VCN injection mechanism of FIG. 23 is that the multicast expander 82 is made responsive to every new cell arrival as indicated by each new master VCN generated by block 61; now, on receiving a Kick on a particular master VCN, the multicast expander will only queue for injection those associated output VCNs that are not already in the scheduling loop (that is, held in the eligibility control block 77, queued in the scheduling block 75, or in the process of being recycled by the recycling means 172).

An obvious benefit of this arrangement is that it is no longer necessary to utilise empty flags and stop bits to set up and determine the conditions upon which a Kick is sent to the multicast expander. As a result, the operations of the input and output controls 66 and 69 of the queuing block 63 can be simplified and the Kick generation block 170 of FIG. 22 removed entirely. However, to achieve this benefit, it is necessary to arrange for the multicast expander 83 to know which output VCNs are not in the scheduling loop. Of course, prior to receipt of the first master VCN on a newly set up connection, no output VCNs are in the scheduling loop and so initially the multicast expander can be set with all the output VCNs for that master VCN ready to be injected into the scheduling loop. Furthermore, once the output VCNs associated with a particular master VCN have been injected into the scheduling loop, it becomes easy for the recycling means 172 to notify the multicast expander when an output VCN is about to be dropped from the loop. The recycling means simply passes an output VCN back to the multicast expander rather than to the eligibility control block when the recycling means determines that the output queue 70 for that output VCN is empty (in fact, the output VCN will still also be passed to the eligibility control block for credit setting purposes, but the "more cells" flag will not be set).

The multicast expander 83 then only has to keep a list for each master VCN of which associated output VCNs are not in the scheduling loop; upon receipt of a master VCN from block 61, the multicast expander simply places the appropriate list of output VCNs into an output FIFO for injection by output circuit 84 into the eligibility control block 77.

Among other possible variants are:
permitting multiple occurences of the output VCNs in the scheduling means (the multicast expander always injecting the full set of output identifiers associated with a master VCN upon the receipt of a corresponding cell; in this case, no recycling means would be required);
storing the cell bodies directly in linked lists rather than separately storing the cell-body sequencing data in the queuing block.

For practical reasons, neither of these possible variants is preferred.

It will be appreciated that many of the concepts of the controller described above can be applied to packet-based systems having variable length packets as well as to systems handling cells (fixed-length packets).

We claim:

1. Apparatus for receiving at least one input stream of packets each having a packet body and multicasting this stream as a plurality of output streams of packets by copying across the packet bodies of the packets of the input stream into packets of the output streams, said apparatus comprising:

input means for receiving packets and determining to which input stream each packet belongs, storage means for storing both the packet bodies of the packets received by the input means and a respective sequence data set for each input stream, each sequence data set serving to order the packet bodies received for the corresponding input stream in order of receipt, the storage means including an input control which upon a new packet body being stored, updates the sequence data set of the input stream to which the packet belongs as determined by said input means, and an output control for maintaining for each output stream a sequence position indicator referencing into the sequence data set of the corresponding input stream to indicate the next packet body to be sent on the output stream concerned, and output means for scheduling output on said output streams, for communicating with the output control of the storage means to identify the packet body next to be output on the currently-scheduled output stream, and for retrieving and outputting the identified packet body on the scheduled output stream.

2. Apparatus according to claim 1, wherein said packet bodies and sequence data sets are separately held in said storage means, each sequence data set comprising a linked list of packet-details entries each with a packet-body pointer to a respective corresponding packet body and a next-entry pointer to the next entry, if any, in the same list; said input control, upon a new packet body being stored, setting up a corresponding packet-details entry in the appropriate linked list, this setting up including setting the packet-body pointer of this entry to point to the newly stored packet body; each said sequence position indicator maintained by said output control for each output stream, pointing to the packet-details entry for the packet body next to be sent for the output stream concerned.

3. Apparatus according to claim 2, wherein each said packet-details entry has a multicast count item which is set by said input control, upon setting up of the entry, to the value of the number of output streams to be multicast from the input stream associated with the linked list of which the packet-details entry is a part, said output control decrementing the count item of a packet-details entry each time said output means outputs the corresponding packet body until the packet body has been sent on all relevant output streams whereupon the output control causes the removal of the entry from the corresponding linked list.

4. Apparatus according to claim 2, wherein each input stream is identified in the apparatus by a corresponding input identifier, said input means providing this identifier for each new packet° received thereby to indicate to which input stream the packet belongs, said input control of the storage means keeping respective list pointers pointing to the tail of each said list and maintaining an association between each input identifier and the list pointer that points to the linked list associated with the input stream identified by the input identifier.

5. Apparatus according to claim 4, wherein each linked list has a tail entry devoid of packet-related information, the said list pointer kept by the input control pointing to the tail entry of the corresponding linked list; and the input control, upon a new packet body being stored, adding a new tail entry to the relevant linked list and using the former tail entry of that list as the packet-details entry for the new packet body, the control means adjusting the list pointer for that list accordingly.

6. Apparatus according to claim 1, wherein each output stream is identified in the apparatus by a corresponding output identifier, the output means including send-control means for effecting output scheduling of said output streams on the basis of said output identifiers and indicating the next scheduled output stream by outputting the corresponding output identifier; the output control of the storage means maintaining an association between each output identifier and the sequence position indicator for the output stream identified by said output identifier, and being operative when supplied with a said output identifier by the output means, to utilise said association to retrieve the packet-body pointer for the next packet body to be output on the output stream concerned.

7. Apparatus according to claim 6, wherein said send-control means comprises:

scheduling means for effecting said output scheduling on the basis of said output identifiers, and for indicating the next scheduled output stream by outputting the corresponding output identifier, thereby removing it from the scheduling means, and, injection means for injecting output identifiers into the scheduling means, the injection means being responsive to the receipt by said input means of at least certain of said packets newly received thereat to inject into the scheduling means the output identifiers of at least some of the output streams associated with the input streams to which said certain of said packets belong;

said send-control means being such that a said output identifier can be present only once at any one time in said scheduling means, and the send-control means further comprising recycling means responsive to the state of the sequence data set relevant the output identifier last output by said scheduling means, to return that output identifier to the scheduling means in the event that said sequence data set indicates there is at least one further packet body available for sending on the output stream concerned.

8. Apparatus according to claim 1, wherein said packets are ATM cells.

9. Apparatus according to claim 1, wherein:

said packet bodies are each stored only once in said storage means, said sequence data sets together have a respective entry for each packet body, each entry including a pointer to the corresponding packet body, and each entry being present only once in said sequence data sets taken together, and, each output stream is identified in the apparatus by a respective output identifier and said output means includes send-control means for effecting output scheduling on the basis of said output identifiers, each said identifier being actively present no more than once at any one time in said send-control means.

* * * * *

UNITED STATES PATENT AND TRADEMARK OFFICE
CERTIFICATE OF CORRECTION

PATENT NO. : 5,572,522
DATED : November 5, 1996
INVENTOR(S) : Costas Calamvokis, et al It is certified that error appears in the above-indentified patent and that said Letters Patent is hereby corrected as shown below:

Column 6, Line 43, change "show" to --shows--.

Column 10, Line 17, change "42" to --44--.

Column 10, Line 45, change "manupulating" to --manipulating--.

Column 13, Line 14, change "63.y" to --63.--.

Column 15, Line 28, change "furthermore" to --Furthermore--.

Column 20, Line 40, change "mined" to --ruined--.

Column 21, Line 16, change "greated" to --greater--.

Column 21, Line 31, change "with" to --to--.

Column 22, Line 3, change "identify" to --identifier--.

Column 22, Line 16, after "block" insert --63--.

Column 24, Line 20, change "correspondig" to --corresponding--.

Column 24, Line 57, change "multicalt" to --multicast--.

UNITED STATES PATENT AND TRADEMARK OFFICE
CERTIFICATE OF CORRECTION

PATENT NO. : 5,572,522  
DATED : November 5, 1996  
INVENTOR(S) : Costas Calamvokis, et al Page 2 of 3

It is certified that error appears in the above-indentified patent and that said Letters Patent is hereby corrected as shown below:

Column 25, Line 4, change "nos" to --no--.

Column 25, Line 35, change "the" to --The--.

Column 26, Line 1, change "14 1" to --141--.

Column 27, Line 5, change "3, 4, 13 5, 6, 10, 12" to

--3, 4, 13

5, 6, 10, 12--.

Column 27, Line 63, change "the" to --The--. (2nd occurrence)

Column 27, Line 66, change "in" to --is--. (1st occurrence)

Column 28, Line 43, change "maintain" to --maintains--.

Column 28, Line 57, change "ligher" to --higher--.

Column 30, Line 6, change "is" to --it--.

Column 30, Line 17, change "the" to --The--.

Column 30, Line 30, change ":" to --;--.

UNITED STATES PATENT AND TRADEMARK OFFICE
CERTIFICATE OF CORRECTION

PATENT NO. : 5,572,522
DATED : November 5, 1996
INVENTOR(S) : Costas Calamvokis, et al It is certified that error appears in the above-indentified patent and that said Letters Patent is hereby corrected as shown below:

Column 31, Line 64, change "pan" to --part--.

Column 32, Line 4, change "detaild" to --detailed--.

Signed and Sealed this

First Day of April, 1997

Attest:

BRUCE LEHMAN

Attesting Officer    Commissioner of Patents and Trademarks